(12) United States Patent
Banning et al.

(10) Patent No.: US 7,683,192 B2
(45) Date of Patent: Mar. 23, 2010

(54) COLORANT COMPOUNDS

(75) Inventors: Jeffrey H. Banning, Hillsboro, OR (US); Wolfgang G. Wedler, Tualatin, OR (US); C. Wayne Jaeger, Beaverton, OR (US)

(73) Assignee: Xerox Corporation, Norwalk, CT (US)

( * ) Notice: Subject to any disclaimer, the term of this patent is extended or adjusted under 35 U.S.C. 154(b) by 1214 days.

(21) Appl. No.: 10/902,594

(22) Filed: Jul. 29, 2004

(65) Prior Publication Data
US 2006/0025616 A1 Feb. 2, 2006

(51) Int. Cl.
C09B 1/16 (2006.01)

(52) U.S. Cl. .................. 552/243; 552/238; 552/244

(58) Field of Classification Search ............... 552/238, 552/243, 244
See application file for complete search history.

(56) References Cited

U.S. PATENT DOCUMENTS

| | | | |
|---|---|---|---|
| 2,756,234 A | 7/1956 | Elslager | |
| 3,076,808 A | 2/1963 | Blout et al. | |
| 3,324,131 A | 6/1967 | Genta | |
| 3,653,932 A | 4/1972 | Berry et al. | 106/22 |
| 3,734,934 A | 5/1973 | Kolliker et al. | 260/376 |
| 4,316,918 A | 2/1982 | Bunes et al. | |
| 4,390,369 A | 6/1983 | Merritt et al. | 106/31 |
| 4,446,470 A | 5/1984 | Sugiyama et al. | |
| 4,484,948 A | 11/1984 | Merritt et al. | 106/31 |
| 4,684,956 A | 8/1987 | Ball | 346/1.1 |
| 4,775,760 A | 10/1988 | Pruett et al. | |
| 4,851,045 A | 7/1989 | Taniguchi | 106/31 |
| 4,889,560 A | 12/1989 | Jaeger et al. | 106/27 |
| 4,889,761 A | 12/1989 | Titterington et al. | 428/195 |
| 5,221,335 A | 6/1993 | Williams et al. | 106/23 A |
| 5,340,910 A | 8/1994 | Chamberlin et al. | |
| 5,372,852 A | 12/1994 | Titterington et al. | 427/288 |
| 5,496,879 A | 3/1996 | Griebel et al. | 524/320 |
| 5,507,864 A | 4/1996 | Jaeger et al. | 106/22 A |
| 5,621,022 A | 4/1997 | Jaeger et al. | 523/161 |
| 5,902,841 A | 5/1999 | Jaeger et al. | 523/161 |
| 6,174,937 B1 | 1/2001 | Banning et al. | 523/160 |
| 6,235,094 B1 | 5/2001 | Banning et al. | 106/31.29 |
| 6,395,078 B1 | 5/2002 | Jaeger | 106/31.44 |
| 6,422,695 B1 | 7/2002 | Jaeger | 347/88 |
| 2004/0077887 A1 | 4/2004 | Banning et al. | 552/237 |
| 2004/0082801 A1 | 4/2004 | Jaeger et al. | 552/225 |
| 2004/0102540 A1 | 5/2004 | Jaeger et al. | 523/160 |
| 2004/0106782 A1 | 6/2004 | Iwamoto et al. | |

FOREIGN PATENT DOCUMENTS

| | | |
|---|---|---|
| BE | 680765 | 11/1966 |
| BR | PI01035819 | 3/2002 |
| CA | 2355533 | 2/2002 |
| EP | 0 206 286 B1 | 5/1990 |
| EP | 0 187 352 B1 | 6/1991 |
| EP | 0 927 747 A | 7/1999 |
| EP | 1 182 232 | 2/2002 |
| EP | 1 281 737 A | 2/2003 |
| EP | 1 403 327 A1 | 3/2004 |
| EP | 1 403 336 A1 | 3/2004 |
| FR | 1 480 010 | 5/1967 |
| FR | 1480010 | * 5/1967 |
| GB | 652448 | 4/1951 |
| GB | 687807 | 2/1953 |
| GB | 1449915 | * 9/1976 |
| GB | 2 021 138 A | 11/1979 |
| WO | WO 94/04619 | 3/1994 |

OTHER PUBLICATIONS

Copending U.S. Appl. No. (not yet assigned;), filed concurrently herewith, entitled "Phase Change Inks," by Jeffery H. Banning et al.
English abstract for German Patent Publications DE 4205636AL.
English abstract for German Patent Publications DE 4205713AL.
English abstract for Japanese Patent Publication JP 2002129044.
English abstract for Japanese Patent Publication 63223064.
Oriental Chem Ind Co., JP 48 085633, Nov. 13, 1973, Derwent Publications Ltd., Section Ch, Week 197423.
Nippon Kayaku KK, JP 49 030419, Mar. 18, 1974, Derwent Publications Ltd., Section Ch, Week 197447.
English abstract for JP 63 235371.
English abstract for JP 63 223064.

* cited by examiner

Primary Examiner—Barbara P Badio
(74) Attorney, Agent, or Firm—Oliff & Berridge, PLC

(57) ABSTRACT

Disclosed is a colorant compound of the formula

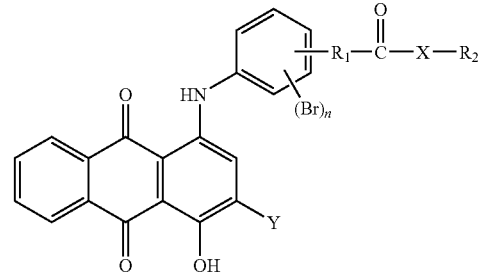

wherein Y is a hydrogen atom or a bromine atom, n is an integer of 0, 1, 2, 3, or 4, $R_1$ is an alkylene group, an arylene group, an arylalkylene group, or an alkylarylene group, provided that no oxygen atom creates a

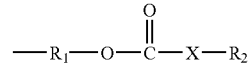

linkage, X is —O— or —$NR_3$— wherein $R_3$ is a hydrogen atom, an alkyl group, an aryl group, an arylalkyl group, or an alkylaryl group, and $R_2$ is a hydrogen atom, an alkyl group, an aryl group, an arylalkyl group, or an alkylaryl group.

51 Claims, No Drawings

COLORANT COMPOUNDS

CROSS-REFERENCE TO RELATED APPLICATIONS

Copending Application U.S. Ser. No. 10/260,146, filed Sep. 27, 2002, entitled "Colorant Compounds," U.S. Publication 20040077887, with the named inventors Jeffery H. Banning and C. Wayne Jaeger, the disclosure of which is totally incorporated herein by reference, discloses compounds of the formula

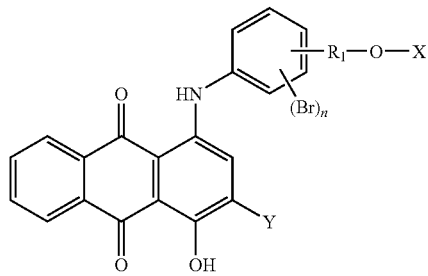

wherein Y is a hydrogen atom or a bromine atom, n is an integer of 0, 1, 2, 3, or 4, $R_1$ is an alkylene group or an arylalkylene group, and X is (a) a hydrogen atom, (b) a group of the formula

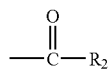

wherein $R_2$ is an alkyl group, an aryl group, an arylalkyl group, or an alkylaryl group, (c) an alkyleneoxy, aryleneoxy, arylalkyleneoxy, or alkylaryleneoxy group, or (d) a group of the formula

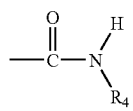

wherein $R_4$ is an alkyl group, an aryl group, an arylalkyl group, or an alkylaryl group.

Copending Application U.S. Ser. No. 10/260,376, filed Sep. 27, 2002, U.S. Publication 20040102540, entitled "Phase Change Inks," with the named inventors C. Wayne Jaeger and Jeffery H. Banning, the disclosure of which is totally incorporated herein by reference, discloses a phase change ink composition comprising a phase change ink carrier and a colorant compound of the formula

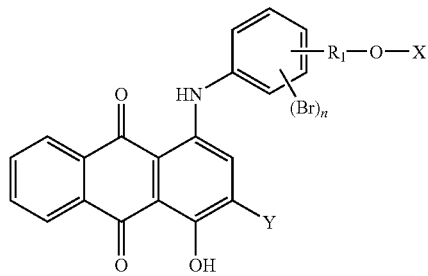

wherein Y is a hydrogen atom or a bromine atom, n is an integer of 0, 1, 2, 3, or 4, $R_1$ is an alkylene group or an arylalkylene group, and X is (a) a hydrogen atom, (b) a group of the formula

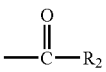

wherein $R_2$ is an alkyl group, an aryl group, an arylalkyl group, or an alkylaryl group, (c) an alkyleneoxy, aryleneoxy, arylalkyleneoxy, or alkylaryleneoxy group, or (d) a group of the formula

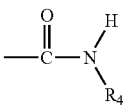

wherein $R_4$ is an alkyl group, an aryl group, an arylalkyl group, or an alkylaryl group.

Copending Application U.S. Ser. No. 10/260,379, filed Sep. 27, 2002, U.S. Publication 20040082801, entitled "Methods for Making Colorant Compounds," with the named inventors C. Wayne Jaeger and Jeffery H. Banning, the disclosure of which is totally incorporated herein by reference, discloses a process for preparing a colorant of the formula

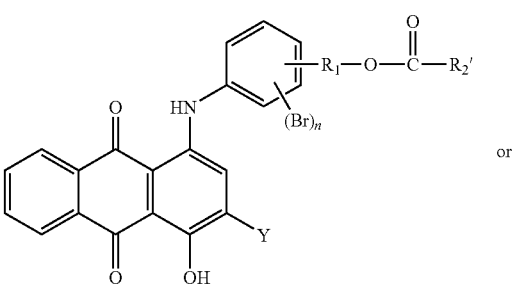

or

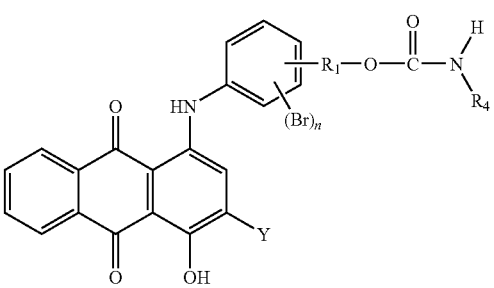

wherein Y is a hydrogen atom or a bromine atom, n is an integer of 0, 1, 2, 3, or 4, $R_1$ is an alkylene group or an arylalkylene group, $R_2$ is an alkyl group, an aryl group, an arylalkyl group, or an alkylaryl group, and $R_4$ is an alkyl group, an aryl group, an arylalkyl group, or an alkylaryl group, can be prepared by a process which comprises (a) preparing a first reaction mixture by admixing (1) leucoquinizarin and, optionally, quinizarin, (2) an aminobenzene substituted with an alcohol group of the formula —$R_1$—OH, (3) boric acid, and (4) an optional solvent, and heating the first reaction mixture to prepare an alcohol-substituted colorant of the formula

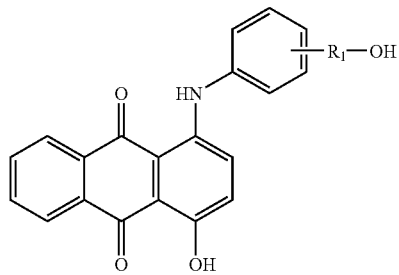

followed by (b) converting the colorant thus prepared to either (i) an ester-substituted colorant by reaction with an esterification compound which is either (A) an anhydride of the formula

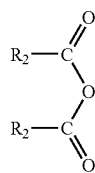

or (B) an acid of the formula R$_2$COOH in the presence of an optional esterification catalyst, or (ii) a urethane-substituted colorant by reaction with an isocyanate compound of the formula

and (c) brominating the colorant thus prepared, wherein either conversion to ester or urethane can be performed before bromination or bromination can be performed before conversion to ester or urethane.

Copending Application U.S. Ser. No. 10/902,602, filed concurrently herewith, entitled "Phase Change Inks," with the named inventors Jeffery H. Banning, Wolfgang G. Wedler, and C. Wayne Jaeger, the disclosure of which is totally incorporated herein by reference, discloses a phase change ink composition comprising a phase change ink carrier and a colorant compound of the formula

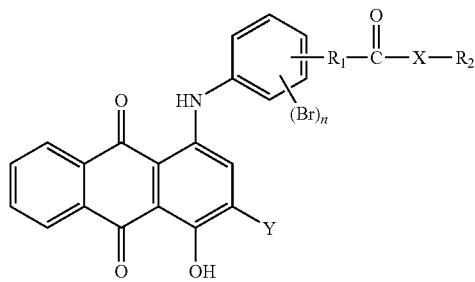

wherein Y is a hydrogen atom or a bromine atom, n is an integer of 0, 1, 2, 3, or 4, R$_1$ is an alkylene group, an arylene group, an arylalkylene group, or an alkylarylene group, provided that no oxygen atom creates a

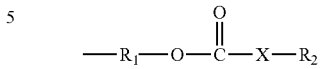

linkage, X is —O— or —NR$_3$— wherein R$_3$ is a hydrogen atom, an alkyl group, an aryl group, an arylalkyl group, or an alkylaryl group, and R$_2$ is a hydrogen atom, an alkyl group, an aryl group, an arylalkyl group, or an alkylaryl group.

BACKGROUND

Disclosed herein are colorant compounds. More specifically, disclosed herein are colorant compounds particularly suitable for use in hot melt or phase change inks. One embodiment is directed to compounds of the formula

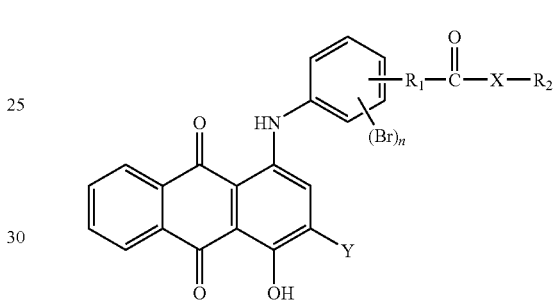

wherein Y is a hydrogen atom or a bromine atom, n is an integer of 0, 1, 2, 3, or 4, R$_1$ is an alkylene group, an arylene group, an arylalkylene group, or an alkylarylene group, provided that no oxygen atom creates a

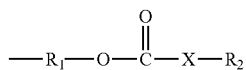

linkage, X is —O— or —NR$_3$— wherein R$_3$ is a hydrogen atom, an alkyl group, an aryl group, an arylalkyl group, or an alkylaryl group, and R$_2$ is a hydrogen atom, an alkyl group, an aryl group, an arylalkyl group, or an alkylaryl group.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 6,395,078 (Jaeger), U.S. Pat. No. 6,422,695 (Jaeger), Canadian Patent Publication 2 355 533 (filed Aug. 20, 2001, published Feb. 23, 2002), European Patent Publication EP 1 182 232 (filed Aug. 17, 2001, published Feb. 27, 2001), Japanese Patent Publication JP 2002129044 (filed Aug. 8, 2001, published May 9, 2002), Brazilian Patent Publication PI01035819 (filed Aug. 22, 2001, published Mar. 26, 2002), and Mexican Patent Application 2001008418 (filed Aug. 20, 2001), the disclosures of each of which are totally incorporated herein by reference, disclose a compound having the formula

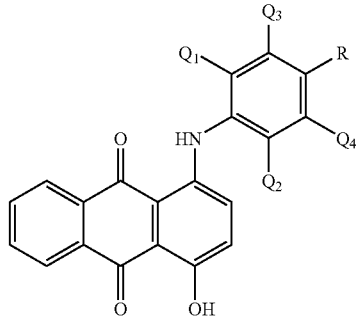

wherein at least one $Q_1$, $Q_2$, $Q_3$, and $Q_4$ is a halogen atom and any of $Q_1$, $Q_2$, $Q_3$ and $Q_4$ which is not a halogen atom is a hydrogen atom, and wherein R comprises at least two carbon atoms. The invention further encompasses inclusion of such compound into phase change ink carrier compositions, as well as printing methods utilizing such compound.

British Patent Publication GB 2 021 138 (Hohmann et al.), the disclosure of which is totally incorporated herein by reference, discloses mixtures of dyestuffs of the formula

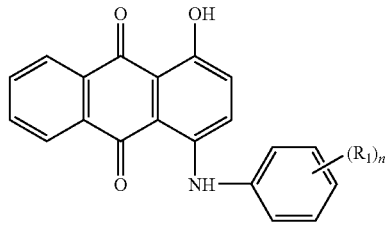

and of the formula

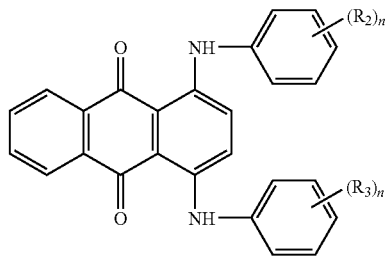

wherein $R_1$, $R_2$, and $R_3$ denote $C_1$-$C_4$ alkyl, $C_1$-$C_4$ alkoxy, or halogen, and n denotes 2 or 3, which are suitable for dyeing polyester fibers by the exhaustion process. Dark blue and navy blue dyeings with good fastness properties are obtained.

U.S. Pat. No. 6,174,937 (Banning et al.), the disclosure of which is totally incorporated herein by reference, discloses a phase change ink comprising a material of the formula

wherein $X_1$, $X_2$, $X_3$ and $X_4$ are segments comprising atoms selected from groups V and VI of the periodic table; wherein at least one $R_1$ and $R_5$ comprises at least 37 carbon units; and wherein $R_2$, $R_3$ and $R_4$ each comprise at least one carbon unit. The invention further encompasses a composition of matter, as well as methods of reducing coefficients of friction of phase change ink formulations.

U.S. Pat. No. 5,507,864 (Jaeger et al.), the disclosure of which is totally incorporated herein by reference, discloses a phase change ink composition that includes a combination of different dye types such as an anthraquinone dye and a xanthene dye, which is most preferably a rhodamine dye. While each dye type is insufficiently soluble with respect to favored carrier compositions to preserve color saturation in reduced ink quantity prints, the dye type combination permits increased dye loading and maintains print quality. In a preferred embodiment of the invention, a favored carrier composition is adjusted to promote the colored form of a preferred rhodamine dye (C.I. Solvent Red 49) and mixed with a preferred anthraquinone dye (C.I. Solvent Red 172) whose concentration is kept below a critical level to prevent post printed blooming. The resulting preferred phase change ink compositions provide a magenta phase change ink with enhanced light fastness and color saturation, as well as good compatibility with preferred existing subtractive primary color phase change inks.

U.S. Pat. No. 5,902,841 (Jaeger et al.), the disclosure of which is totally incorporated herein by reference, discloses a phase change ink composition wherein the ink composition utilizes a colorant in combination with a selected phase change ink carrier composition containing at least one hydroxy-functional fatty amide compound.

R. Butnaru et al., "Researches on Dyeing of Cotton Fabrics with Acid Dyestuffs, Concomitantly with Crease-Resist Treatments," *Cellulose Chem. Technol.*, 29, p. 471 (1995), the disclosure of which is totally incorporated herein by reference, discloses an analysis of the results obtained on dyeing of cotton cellulosic fabrics with acid dyestuffs, on employing crease-resist agents with polyfunctional structure. The conclusion was reached that no chemical or physical bonds occur between dyestuffs and the fiber, the dyestuffs being fixed onto the resin's aminic groups formed as a result of the thermal, crease-resist treatment. Washing resistance of the cellulosic materials thus dyed attained the values obtained as a result of dyeing with direct dyestuffs, specific for these types of fibers.

U.S. Pat. No. 6,235,094 (Banning et al.), the disclosure of which is totally incorporated herein by reference, discloses a compound having the formula

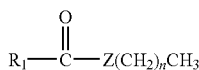

wherein $R_1$, Z and the carbonyl can be comprised by a common ring, wherein $R_1$ comprises a chromophore that absorbs light from the visible wavelength range, and wherein n is an integer that is at least 12. The invention also encompasses a solid phase change ink composition. Such composition includes a phase change ink carrier and a colorant. The colorant comprises a chromophore that absorbs light from the visible wavelength range, and has the formula

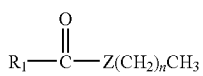

wherein $R_1$, Z and the carbonyl can be comprised by a common ring, wherein n is an integer that is at least 12. Additionally, the invention encompasses a method of forming a colorant. A first compound having the formula

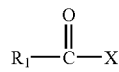

is reacted with a second compound having the formula $Z(CH_2)_nCH_3$, wherein n is an integer that is at least 12, to form a third compound having the formula

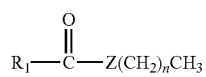

wherein the third compound comprises a chromophore that absorbs light from the visible wavelength range.

U.S. Pat. No. 3,734,934 (Kolliker et al.), the disclosure of which is totally incorporated herein by reference, discloses dyestuffs of the formula

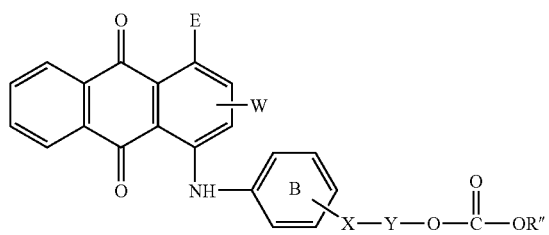

wherein W is chlorine, bromine, cyano, lower alkyl, lower alkoxy, carbonyl, phenoxycarbonyl, lower alkylthio, phenylthio, lower alkyl sulfonyl, or a grouping of the formula

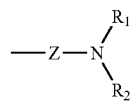

wherein Z is —CO— or —SO$_2$— and $R_1$ and $R_2$ are each independently hydrogen or lower alkyl, Y is lower alkylene, —CH$_2$CH$_2$OCH$_2$CH$_2$—, or —CH$_2$CH$_2$CH$_2$OCH$_2$CH$_2$CH$_2$—, X is a direct bond, —O—, —S—, —NH—, —COHN—, or —SO$_2$NH—, R' is lower alkyl, cyclohexyl, phenyl, or phenyl substituted by chlorine, lower alkyl, or lower alkoxy, or bromine, the nucleus B is either unsubstituted or further monosubstituted by chlorine, lower alkyl, or lower alkoxy, E is NH$_2$, OH, or NHT, and T is lower alkyl, cyclohexyl, phenyl, lower alkyl phenyl, or phenoxyphenyl.

British Patent 687,807, the disclosure of which is totally incorporated herein by reference, discloses hydroxy ethoxymethyl phenyl-amino-anthraquinone dyestuffs and derivatives thereof of the formula

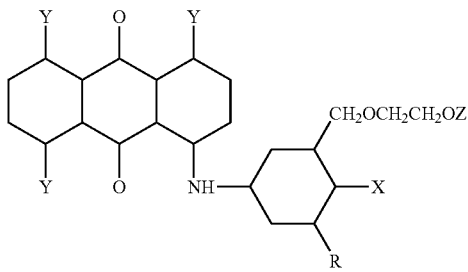

wherein X is hydrogen or methyl, R is hydrogen or CH$_3$OCH$_2$CH$_2$OZ, Z is hydrogen, hydroxy alkyl, or alkoxy alkyl, and Y is hydrogen, hydroxy, or

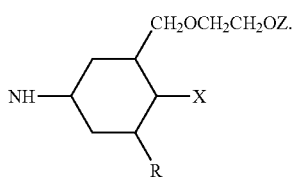

These compounds exhibit substantially enhanced substantivity for acetate rayon and have the ability to withstand the action of acid gas fumes such as the combustion products of industrial and engine fuels.

Japanese Patent Publication 63223064, the disclosure of which is totally incorporated herein by reference, discloses a blue coloring material for use in optical filters which is of the formula

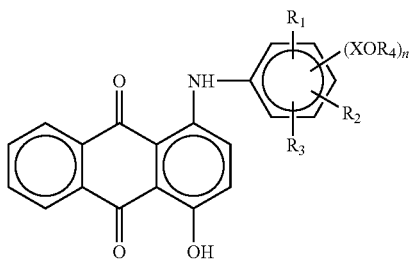

wherein R$_1$ to R$_3$ are each H, alkyl, alkoxy alkyl, hydroxy alkyl, or halogen, R$_4$ is acyl, (alkyl)carbamoyl, arylcarbamoyl, aralkylcarbamoyl, alkenylcarbamoyl, methanesulfonyl, or H, X is alkylene, alkylene-O-alkylene, or alkylene-S-alkylene, and n is 1 or 2. An example is 1-{4-(2-benzoyloxyethyl)anilino}-4-hydroxyanthraquinone.

While known compositions and processes are suitable for their intended purposes, a need remains for improved colorant compounds. In addition, a need remains for colorant compositions particularly suitable for use in phase change inks. Further, a need remains for colorant compounds with a desirable magenta color. Additionally, a need remains for colorant compounds with desirable thermal stability. There is also a need for colorant compounds with good lighffastness. In addition, there is a need for colorant compounds that exhibit desirable solubility characteristics in phase change ink carrier compositions. Further, there is a need for colorant compounds that, when incorporated into phase change inks, exhibit reduced migration within a layer of printed ink. Additionally, there is a need for colorant compounds that, when incorporated into phase change inks, exhibit reduced crystallization within a layer of printed ink. A need also remains for colorant compounds that, when incorporated into phase change inks, enable production of prints that maintain uniform color over long periods of time without unevenness or blotching. In addition, a need remains for colorant compounds that, when incorporated into phase change inks, enable production of prints that retain their original color over long periods of time. Further, a need remains for colorant compounds that, when incorporated into phase change inks, enable production of prints that exhibit reduced sensitivity to image discoloration upon contact with human fingertips. Additionally, a need remains for colorant compounds that can be incorporated into phase change inks in desirably high concentrations. There is also a need for colorant compounds that can be manufactured easily and practically. In addition, there is a need for colorant compounds that can easily be converted to derivative molecules thereof. Further, there is a need for colorant compounds that can be derivatized with a desirable degree of versatility.

SUMMARY

Disclosed herein are compounds of the formula

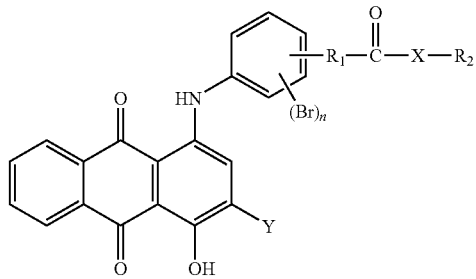

wherein Y is a hydrogen atom or a bromine atom, n is an integer of 0, 1, 2, 3, or 4, R$_1$ is an alkylene group, an arylene group, an arylalkylene group, or an alkylarylene group, provided that no oxygen atom creates a

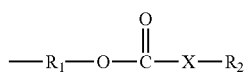

linkage, X is —O— or —NR$_3$— wherein R$_3$ is a hydrogen atom, an alkyl group, an aryl group, an arylalkyl group, or an alkylaryl group, and R$_2$ is a hydrogen atom, an alkyl group, an aryl group, an arylalkyl group, or an alkylaryl group.

DETAILED DESCRIPTION

The colorant compounds disclosed herein are of the formula

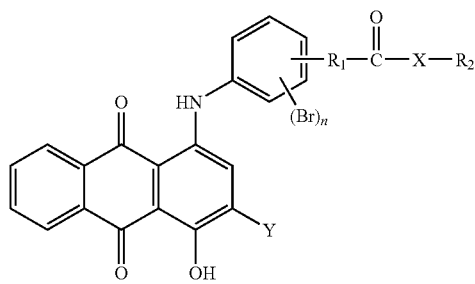

wherein Y is a hydrogen atom or a bromine atom, n is an integer of 0, 1, 2, 3, or 4, $R_1$ is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group, provided that no oxygen atom creates a

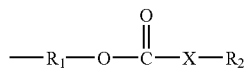

linkage), in one embodiment with at least about 1 carbon atom, and in one embodiment with no more than about 50 carbon atoms, in another embodiment with no more than about 20 carbon atoms, in yet another embodiment with no more than about 6 carbon atoms, in still another embodiment with no more than about 2 carbon atoms, and in another embodiment with exactly 1 carbon atom, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group, provided that no oxygen atom creates a

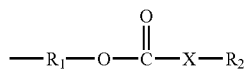

linkage), in one embodiment with at least about 5 carbon atoms, and in another embodiment with at least about 6 carbon atoms, and in one embodiment with no more than about 50 carbon atoms, in another embodiment with no more than about 20 carbon atoms, in yet another embodiment with no more than about 7 carbon atoms, although the number of carbon atoms can be outside of these ranges, such as phenyl or the like, (iii) an arylalkylene group (including unsubstituted and substituted arylalkylene groups, and wherein hetero atoms, such as oxygen, nitrogen, sulfur, silicon, phosphorus, and the like either may or may not be present in either or both of the aryl portion and the alkyl portion of the arylalkylene group, provided that no oxygen atom creates a

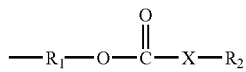

linkage), in one embodiment with at least about 6 carbon atoms, and in another embodiment with at least about 7 carbon atoms, and in one embodiment with no more than about 50 carbon atoms, in another embodiment with no more than about 20 carbon atoms, in yet another embodiment with no more than about 7 carbon atoms, although the number of carbon atoms can be outside of these ranges, such as benzyl, phenylethyl, and the like, including (a) arylalkylene groups wherein both the aryl and the alkyl portions form the linkage between the

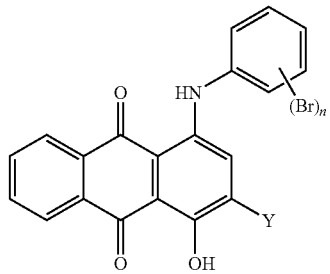

moiety and the

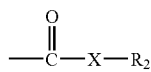

moiety, such as

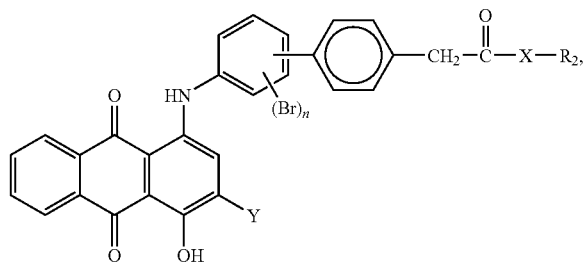

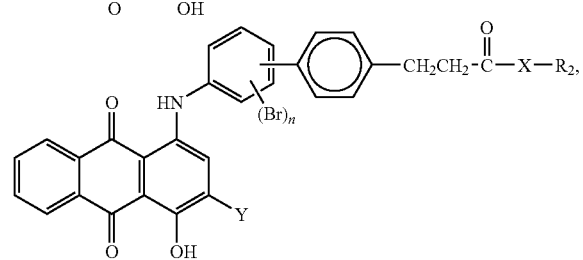

and the like, and (b) arylalkylene groups wherein only the alkyl portion forms the linkage between the

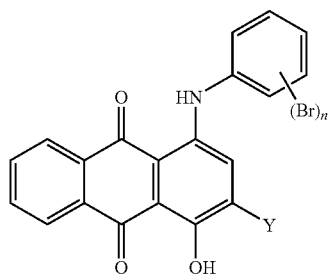

moiety and the

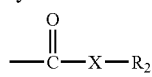

moiety and the alkyl portion has aryl portions pending therefrom, such as

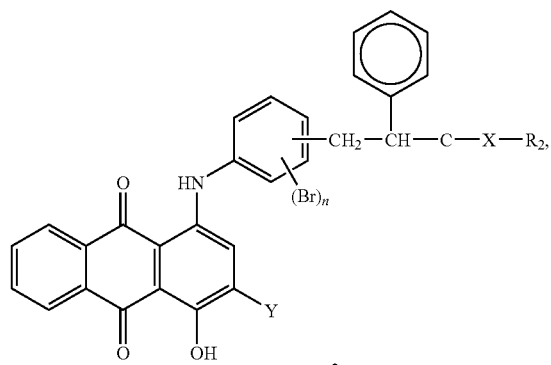

and the like, or (iv) an alkylarylene group (including unsubstituted and substituted alkylarylene groups, and wherein hetero atoms, such as oxygen, nitrogen, sulfur, silicon, phosphorus, and the like either may or may not be present in either or both of the aryl portion and the alkyl portion of the alkylarylene group, provided that no oxygen atom creates a

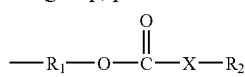

linkage), in one embodiment with at least about 6 carbon atoms, and in another embodiment with at least about 7 carbon atoms, and in one embodiment with no more than about 50 carbon atoms, in another embodiment with no more than about 20 carbon atoms, in yet another embodiment with no more than about 7 carbon atoms, although the number of carbon atoms can be outside of these ranges, such as tolyl or the like, including (a) alkylarylene groups wherein both the aryl and the alkyl portions form the linkage between the

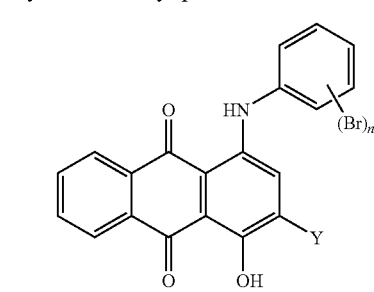

moiety and the

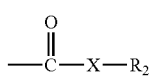

moiety, such as

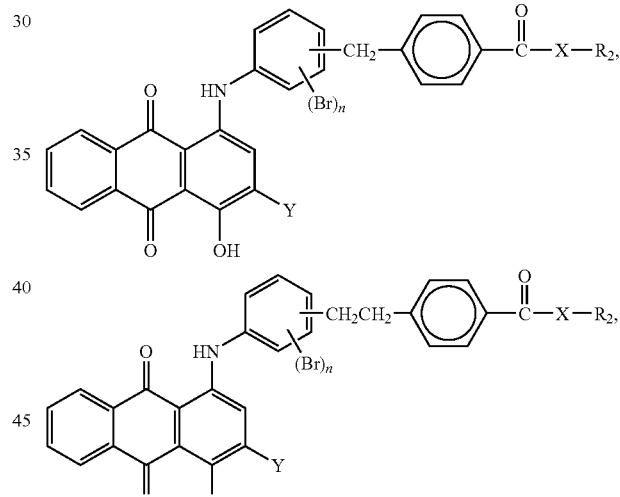

and the like, and (b) alkylarylene groups wherein only the aryl portion forms the linkage between the

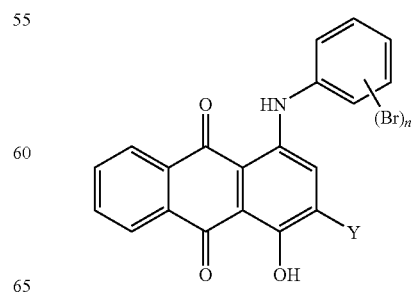

moiety and the

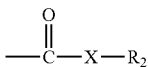

moiety and the aryl portion has alkyl portions pending therefrom, such as

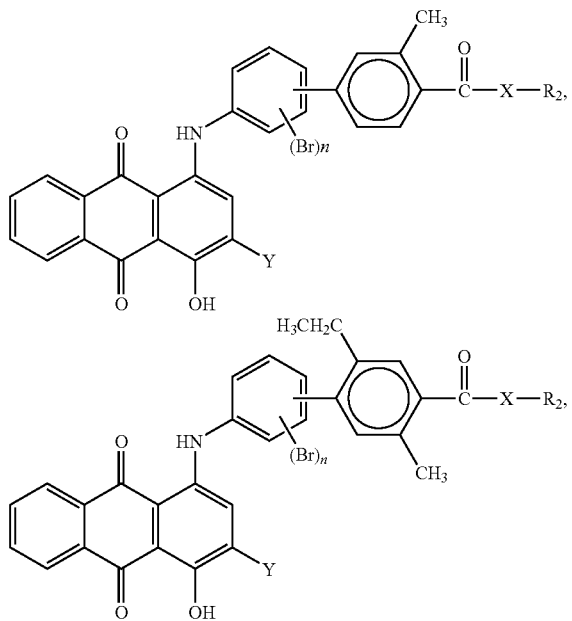

and the like, wherein the substituents on the substituted alkylene, arylene, arylalkylene, or alkylarylene groups can be hydroxy groups, halogen atoms, amine groups, imine groups, ammonium groups, cyano groups, pyridine groups, pyridinium groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring, X is —O— or —NR$_3$— wherein R$_3$ is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 60 carbon atoms, in another embodiment with no more than about 55 carbon atoms, and in yet another embodiment with no more than about 50 carbon atoms, although the number of carbon atoms can be outside of these ranges, (iii) an aryl group (including substituted and unsubstituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 60 carbon atoms, in another embodiment with no more than about 55 carbon atoms, and in yet another embodiment with no more than about 50 carbon atoms, although the number of carbon atoms can be outside of these ranges, (iv) an arylalkyl group (including substituted and unsubstituted arylalkyl groups, and wherein hetero atoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 60 carbon atoms, in another embodiment with no more than about 55 carbon atoms, and in yet another embodiment with no more than about 50 carbon atoms, although the number of carbon atoms can be outside of these ranges, such as benzyl or the like, or (v) an alkylaryl group (including substituted and unsubstituted alkylaryl groups, and wherein hetero atoms, such as oxygen, nitrogen, sulfur, silicon, phosphorus, and the like either may or may not be present in either the alkyl or the aryl portion of the alkylaryl group), in one embodiment with at least about 6 carbon atoms, and in another embodiment with at least about 7 carbon atoms, and in one embodiment with no more than about 60 carbon atoms, in another embodiment with no more than about 55 carbon atoms, and in yet another embodiment with no more than about 50 carbon atoms, although the number of carbon atoms can be outside of these ranges, such as tolyl or the like, and R$_2$ is (i) a hydrogen atom, (ii) an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least about 1 carbon atom, in another embodiment with at least about 2 carbon atoms, in another embodiment with at least about 3 carbon atoms, in yet another embodiment with at least about 4 carbon atoms, in still another embodiment with at least about 5 carbon atoms, in another embodiment with at least about 6 carbon atoms, in yet another embodiment with at least about 7 carbon atoms, in still another embodiment with at least about 8 carbon atoms, in another embodiment with at least about 9 carbon atoms, in yet another embodiment with at least about 10 carbon atoms, in still another embodiment with at least about 11 carbon atoms, in another embodiment with at least about 12 carbon atoms, in yet another embodiment with at least about 13 carbon atoms, in still another embodiment with at least about 14 carbon atoms, in another embodiment with at least about 15 carbon atoms, in yet another embodiment with at least about 16 carbon atoms, in still another embodiment with at least about 17 carbon atoms, in another embodiment with at least about 18 carbon atoms, in yet another embodiment with at least about 19 carbon atoms, in still another embodiment with at least about 20 carbon atoms, in another embodiment with at least about 21 carbon atoms, in yet another embodiment with at least about 22 carbon atoms, in still another embodiment with at least about 23 carbon atoms, in another embodiment with at least about 24 carbon atoms, in yet another embodiment with at least about 25 carbon atoms, in still another embodiment with at least about 26 carbon atoms, in another embodiment with at least about 27 carbon atoms, in yet another embodiment with at least about 28 carbon atoms, in still another embodiment with at least about 29 carbon atoms, in another embodiment with at least about 30 carbon atoms, in yet another embodiment with at least about 31 carbon atoms, in still another embodiment with at least about 32 carbon atoms, in another embodiment with at least about 33 carbon atoms, in yet another embodiment with at least about 34 carbon atoms, in still another embodiment with at least about 35 carbon atoms, in another embodiment with at least about 36 carbon atoms, in yet another embodiment with at least about 37 carbon atoms, in still another embodiment with at least about 38 carbon atoms, in another embodiment with at least about 39 carbon atoms, in yet another embodiment with at least about 40 carbon atoms, in still another embodiment with at least about 41 carbon atoms, in another embodiment with at least about 42 carbon atoms, in yet another embodiment with at least about 43 carbon atoms, in still another embodiment with at least about 44 carbon atoms, in another embodiment with at least about 45 carbon atoms, in yet another embodiment with at least about 46 carbon atoms, in still another embodiment with at least about 47 carbon atoms, in another embodiment with at least about 48 carbon atoms, in yet another embodiment with at least about 49 carbon atoms, and in still another embodiment with at least about 50 carbon atoms, and in one embodiment with no more than about 100 carbon atoms, in another embodiment with no more than about 70 carbon atoms, in yet another embodiment with no more than about 60 carbon atoms, in still another embodiment with no more than about 55 carbon atoms, and in yet still another embodiment with no more than about 50 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 5 carbon atoms, in another embodiment with at least about 6 carbon atoms, in yet another embodiment with at least about 7 carbon atoms, in still another embodiment with at least about 8 carbon atoms, in another embodiment with at least about 9 carbon atoms, in yet another embodiment with at least about 10 carbon atoms, in still another embodiment with at least about 11 carbon atoms, in another embodiment with at least about 12 carbon atoms, in yet another embodiment with at least about 13 carbon atoms, in still another embodiment with at least about 14 carbon atoms, in another embodiment with at least about 15 carbon atoms, in yet another embodiment with at least about 16 carbon atoms, in still another embodiment with at least about 17 carbon atoms, in another embodiment with at least about 18 carbon atoms, in yet another embodiment with at least about 19 carbon atoms, in still another embodiment with at least about 20 carbon atoms, in another embodiment with at least about 21 carbon atoms, in yet another embodiment with at least about 22 carbon atoms, in still another embodiment with at least about 23 carbon atoms, in another embodiment with at least about 24 carbon atoms, in yet another embodiment with at least about 25 carbon atoms, in still another embodiment with at least about 26 carbon atoms, in another embodiment with at least about 27 carbon atoms, in yet another embodiment with at least about 28 carbon atoms, in still another embodiment with at least about 29 carbon atoms, in another embodiment with at least about 30 carbon atoms, in yet another embodiment with at least about 31 carbon atoms, in still another embodiment with at least about 32 carbon atoms, in another embodiment with at least about 33 carbon atoms, in yet another embodiment with at least about 34 carbon atoms, in still another embodiment with at least about 35 carbon atoms, in another embodiment with at least about 36 carbon atoms, in yet another embodiment with at least about 37 carbon atoms, in still another embodiment with at least about 38 carbon atoms, in another embodiment with at least about 39 carbon atoms, in yet another embodiment with at least about 40 carbon atoms, in still another embodiment with at least about 41 carbon atoms, in another embodiment with at least about 42 carbon atoms, in yet another embodiment with at least about 43 carbon atoms, in still another embodiment with at least about 44 carbon atoms, in another embodiment with at least about 45 carbon atoms, in yet another embodiment with at least about 46 carbon atoms, in still another embodiment with at least about 47 carbon atoms, in another embodiment with at least about 48 carbon atoms, in yet another embodiment with at least about 49 carbon atoms, and in still another embodiment with at least about 50 carbon atoms, and in one embodiment with no more than about 100 carbon atoms, in another embodiment with no more than about 70 carbon atoms, in yet another embodiment with no more than about 60 carbon atoms, in still another embodiment with no more than about 55 carbon atoms, and in yet still another embodiment with no more than about 50 carbon atoms, although the number of carbon atoms can be outside of these ranges, (iv) an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, in another embodiment with at least about 7 carbon atoms, in yet another embodiment with at least about 8 carbon atoms, in another embodiment with at least about 9 carbon atoms, in yet another embodiment with at least about 10 carbon atoms, in still another embodiment with at least about 11 carbon atoms, in another embodiment with at least about 12 carbon atoms, in yet another embodiment with at least about 13 carbon atoms, in still another embodiment with at least about 14 carbon atoms, in another embodiment with at least about 15 carbon atoms, in yet another embodiment with at least about 16 carbon atoms, in still another embodiment with at least about 17 carbon atoms, in another embodiment with at least about 18 carbon atoms, in yet another embodiment with at least about 19 carbon atoms, in still another embodiment with at least about 20 carbon atoms, in another embodiment with at least about 21 carbon atoms, in yet another embodiment with at least about 22 carbon atoms, in another embodiment with at least about 23 carbon atoms, in yet another embodiment with at least about 24 carbon atoms, in still another embodiment with at least about 25 carbon atoms, in another embodiment with at least about 26 carbon atoms, in yet another embodiment with at least about 27 carbon atoms, in still another embodiment with at least about 28 carbon atoms, in another embodiment with at least about 29 carbon atoms, in yet another embodiment with at least about 30 carbon atoms, in still another embodiment with at least about 31 carbon atoms, in another embodiment with at least about 32 carbon atoms, in yet another embodiment with at least about 33 carbon atoms, in still another embodiment with at least about 34 carbon atoms, in another embodiment with at least about 35 carbon atoms, in yet another embodiment with at least about 36 carbon atoms, in still another embodiment with at least about 37 carbon atoms, in another embodiment with at least about 38 carbon atoms, in yet another embodiment with at least about 39 carbon atoms, in still another embodiment with at least about 40 carbon atoms, in another embodiment with at least about 41 carbon atoms, in yet another embodiment with at least about 42 carbon atoms, in still another embodiment with at least about 43 carbon atoms, in another embodiment with at least about 44 carbon atoms, in yet another embodiment with at least about 45 carbon atoms, in still another embodiment with at least about 46 carbon atoms, in another embodiment with at least about 47 carbon atoms, in yet another embodiment with at least about 48 carbon atoms, in still another embodiment with at least about 49 carbon atoms, and in yet still another embodiment with at least about 50 carbon atoms, and in one embodiment with no more than about 100 carbon atoms, in another embodiment with no more than about 70 carbon atoms, in yet another embodiment with no more than about 60 carbon atoms, in still another embodiment with no more than about 55 carbon atoms, and in yet still another embodiment with no more than about 50 carbon atoms, although the number of carbon atoms can be outside of these ranges, or (v) an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, in another embodiment with at least about 7 carbon atoms, in yet another embodiment with at least about 8 carbon atoms, in another embodiment with at least about 9 carbon atoms, in yet another embodiment with at least about 10 carbon atoms, in still another embodiment with at least about 11 carbon atoms, in another embodiment with at least about 12 carbon atoms, in yet another embodiment with at least about 13 carbon atoms, in still another embodiment with at least about 14 carbon atoms, in another embodiment with at least about 15 carbon atoms, in yet another embodiment with at least about 16 carbon atoms, in still another embodiment with at least about 17 carbon atoms, in another embodiment with at least about 18 carbon atoms, in yet another embodiment with at least about 19 carbon atoms, in still another embodiment with at least about 20 carbon atoms, in another embodiment with at least about 21 carbon atoms, in yet another embodiment with at least about 22 carbon atoms, in another embodiment with at least about 23 carbon atoms, in yet another embodiment with at least about 24 carbon atoms, in still another embodiment with at least about 25 carbon atoms, in another embodiment with at least about 26 carbon atoms, in yet another embodiment with at least about 27 carbon atoms, in still another embodiment with at least about 28 carbon atoms, in another embodiment with at least about 29 carbon atoms, in yet another embodiment with at least about 30 carbon atoms, in still another embodiment with at least about 31 carbon atoms, in another embodiment with at least about 32 carbon atoms, in yet another embodiment with at least about 33 carbon atoms, in still another embodiment with at least about 34 carbon atoms, in another embodiment with at least about 35 carbon atoms, in yet another embodiment with at least about 36 carbon atoms, in still another embodiment with at least about 37 carbon atoms, in another embodiment with at least about 38 carbon atoms, in yet another embodiment with at least about 39 carbon atoms, in still another embodiment with at least about 40 carbon atoms, in another embodiment with at least about 41 carbon atoms, in yet another embodiment with at least about 42 carbon atoms, in still another embodiment with at least about 43 carbon atoms, in another embodiment with at least about 44 carbon atoms, in yet another embodiment with at least about 45 carbon atoms, in still another embodiment with at least about 46 carbon atoms, in another embodiment with at least about 47 carbon atoms, in yet another embodiment with at least about 48 carbon atoms, in still another embodiment with at least about 49 carbon atoms, and in yet still another embodiment with at least about 50 carbon atoms, and in one embodiment with no more than about 100 carbon atoms, in another embodiment with no more than about 70 carbon atoms, in yet another embodiment with no more than about 60 carbon atoms, in still another embodiment with no more than about 55 carbon atoms, and in yet still another embodiment with no more than about 50 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Since hetero atoms such as oxygen can be present in the alkyl, aryl, alkylene, arylene, and the like groups, these groups also encompass groups such as alkoxy, aryloxy, alkyleneoxy, polyalkyleneoxy, and the like.

In one specific embodiment, at least one of $R_2$ and $R_3$ is other than hydrogen and the total number of carbon atoms in $R_2+R_3$ is at least about 8, in another specific embodiment at least about 12, and in yet another specific embodiment at least about 18, and in one specific embodiment, the total number of carbon atoms in $R_2+R_3$ is no more than about 100, in another specific embodiment no more than about 60, and in yet another specific embodiment no more than about 50, although the total number of carbon atoms in $R_2+R_3$ can be outside of these ranges.

The above formula encompasses monomeric materials. In addition, the above formula encompasses dimeric materials containing two moieties of the formula

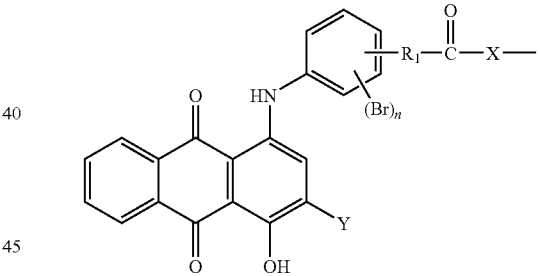

such as dimeric materials of the formula

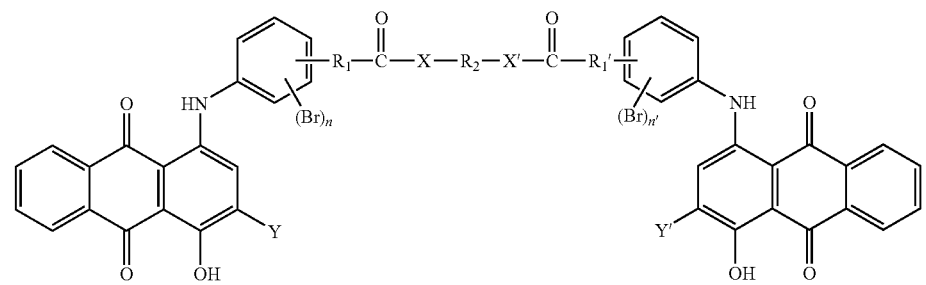

wherein X' has the same definition as X and can be either the same as or different from X, Y' has the same definition as Y and can be either the same as or different from Y, $R_1'$ has the same definition as $R_1$ and can be either the same as or different from $R_1$, and n' is an integer of 0, 1, 2, 3, or 4 and can be either the same as or different from n. $R_2$ in this embodiment can be (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least about 1 carbon atom, and in one embodiment with no more than about 50 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 5 carbon atoms, and in another embodiment with at least about 6 carbon atoms, and in one embodiment with no more than about 50 carbon atoms, although the number of carbon atoms can be outside of these ranges, such as phenyl or the like, (iii) an arylalkylene group (including unsubstituted and substituted arylalkylene groups, and wherein hetero atoms, such as oxygen, nitrogen, sulfur, silicon, phosphorus, and the like either may or may not be present in either or both of the aryl portion and the alkyl portion of the arylalkylene group), in one embodiment with at least about 6 carbon atoms, and in another embodiment with at least about 7 carbon atoms, and in one embodiment with no more than about 50 carbon atoms, although the number of carbon atoms can be outside of these ranges, such as benzyl, phenylethyl, and the like, or (iv) an alkylarylene group (including unsubstituted and substituted alkylarylene groups, and wherein hetero atoms, such as oxygen, nitrogen, sulfur, silicon, phosphorus, and the like either may or may not be present in either or both of the aryl portion and the alkyl portion of the alkylarylene group), in one embodiment with at least about 6 carbon atoms, and in another embodiment with at least about 7 carbon atoms, and in one embodiment with no more than about 50 carbon atoms, although the number of carbon atoms can be outside of these ranges, such as tolyl or the like, wherein the substituents on the substituted alkylene, arylene, arylalkylene, or alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. Since hetero atoms such as oxygen can be present in the alkyl, aryl, alkylene, arylene, and the like groups, these groups also encompass groups such as alkoxy, aryloxy, alkyleneoxy, polyalkyleneoxy, and the like.

Similarly, the above formula encompasses trimeric, tetrameric, and higher moieties as well as oligomeric materials and polymeric materials, said materials containing three or more moieties of the formula

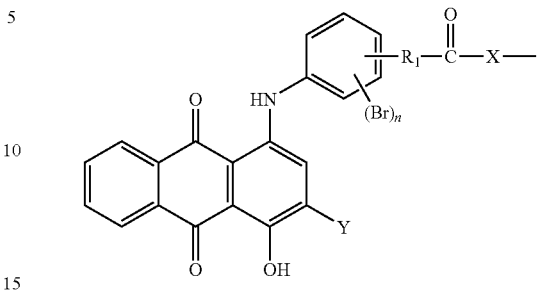

wherein each X, Y, $R_1$, and n, independently of the others, has the definitions for X, Y, $R_1$, and n set forth hereinabove and can be either the same as or different from one another, said moieties being linked by a central atom or group of atoms or bonded to a polymeric chain. These materials can be made by processes analogous to those illustrated herein for the monomeric and dimeric compounds of the present invention.

The colorant compounds disclosed herein can be prepared by any desired or effective method.

For example, an acid-substituted precursor compound can be prepared by reacting (1) leucoquinizarin and, optionally, quinizarin, (2) a compound of the formula $NHR_3\text{-}\phi\text{-}R_1\text{---}COOH$ wherein $\phi$ represents a benzene ring and wherein $R_1$ and $R_3$ are as defined hereinabove, (3) boric acid, and (4) an optional solvent, followed by heating this reaction mixture to effect condensation as follows (illustrated for an embodiment wherein the compound of the formula $NHR_3\text{-}\phi\text{-}R_1\text{---}COOH$ is para-aminophenylacetic acid):

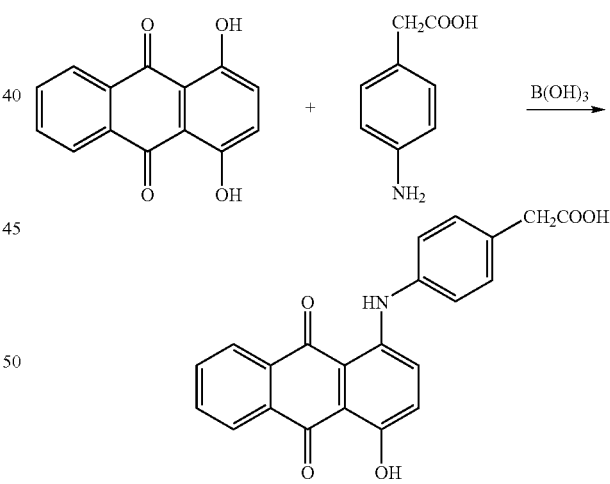

While quinizarin is shown above as the starting material, the presence of leucoquinizarin, which is the reduced form of quinizarin, is helpful for condensing with the acid-substituted amine. The reaction between the amine and the leucoquinizarin further reduces some of the quinizarin present in the reaction mixture to leucoquinizarin, thereby rendering it capable of reacting with more of the amine and furthering the reaction to completion. If desired, the reaction can be carried out solely with leucoquinizarin and with no quinizarin, although for economical purposes such a procedure is often not desirable. In addition, instead of adding leucoquinizarin to a reaction mixture of quinizarin and the acid-substituted amine, leucoquinizarin can be generated in situ by preparing a reaction mixture of quinizarin and the acid-substituted amine and adding to the reaction mixture a reducing agent, as disclosed in, for example, Waring and Hallas, *The Chemistry and Application of Dyes*, ISBN 0-306-43278-1, Plenum Publishing Co. (New York 1990), the disclosure of which is totally incorporated herein by reference.

The quinizarin and the leucoquinizarin are present in any desired or effective relative amounts, in one embodiment at least about 5 moles of leucoquinizarin per every 95 moles of quinizarin, in another embodiment at least about 2 moles of leucoquinizarin per every 3 moles of quinizarin, and in yet another embodiment at least about 1 mole of leucoquinizarin per every 1 mole of quinizarin, and in one embodiment up to 100 percent leucoquinizarin and no quinizarin, although the relative amounts of quinizarin and leucoquinizarin can be outside of these ranges.

The compound of the formula $NHR_3$-$\phi$-$R_1$—COOH (hereinafter also referred to as the acid-substituted aminobenzene) is present in any desired or effective amount, in one embodiment at least about 0.95 mole of acid-substituted aminobenzene per every one mole of (quinizarin plus leucoquinizarin), and in another embodiment at least about 1 mole of acid-substituted aminobenzene per every one mole of (quinizarin plus leucoquinizarin), and in one embodiment no more than about 1.05 moles of acid-substituted aminobenzene per every one mole of (quinizarin plus leucoquinizarin), and in another embodiment no more than about 1 mole of acid-substituted aminobenzene per every one mole of (quinizarin plus leucoquinizarin), although the amount of acid-substituted aminobenzene can be outside of these ranges.

The boric acid, which functions as a catalyst in the reaction between the acid-substituted aminobenzene and the leucoquinizarin, is present in any desired or effective amount, in one embodiment about 1 mole of boric acid per every one mole of (quinizarin plus leucoquinizarin), although the amount of boric acid can be higher or lower than this amount.

When the optional solvent is present, any desired or effective solvent can be used. Examples of suitable solvents include toluene, xylene, chlorobenzene, and the like, as well as mixtures thereof. The reactants are present in the solvent in any desired or effective amount, in one embodiment at least about 25 grams of acid-substituted aminobenzene per every one liter of solvent, in another embodiment at least about 50 grams of acid-substituted aminobenzene per every one liter of solvent, and in another embodiment at least about 100 grams of acid-substituted aminobenzene per every one liter of solvent, and in one embodiment no more than about 500 grams of acid-substituted aminobenzene per every one liter of solvent, in another embodiment no more than about 250 grams of acid-substituted aminobenzene per every one liter of solvent, and in yet another embodiment no more than about 125 grams of acid-substituted aminobenzene per every one liter of solvent, although the amount of solvent can be outside of these ranges.

The reaction mixture containing (1) leucoquinizarin and, optionally, quinizarin, (2) a compound of the formula $NHR_3$-$\phi$-$R_1$—COOH, (3) boric acid, and (4) an optional solvent is heated to any desirable or effective temperature to effect the condensation reaction, typically the reflux temperature of the selected solvent when a solvent is used, in one embodiment at least about 50° C., in another embodiment at least about 60° C., and in yet another embodiment at least about 75° C., and in one embodiment no more than about 150° C., in another embodiment no more than about 120° C., and in yet another embodiment no more than about 80° C., although the temperature can be outside of these ranges.

The reaction mixture containing (1) leucoquinizarin and, optionally, quinizarin, (2) a compound of the formula $NHR_3$-$\phi$-$R_1$—COOH, (3) boric acid, and (4) an optional solvent is heated for any desirable or effective period of time to effect the condensation reaction, in one embodiment at least about 3 hours, and in another embodiment at least about 4 hours, and in one embodiment no more than about 24 hours, although the heating time can be outside of these ranges.

Upon completion of the reaction, the acid-substituted precursor is formed as a solid and can be recovered by cooling and filtering the reaction mixture.

The acid-substituted precursor compound is converted to the colorant by an esterification or amidification reaction and a bromination reaction. The acid-substituted precursor compound can be subjected to an esterification or amidification reaction, followed by subjecting the esterified compound to a bromination reaction. Alternatively, the acid-substituted precursor compound can be subjected to a bromination reaction, followed by subjecting the brominated compound to an esterification or amidification reaction. Both possibilities are discussed herein.

The acid-substituted precursor or brominated acid-substituted precursor can be esterified to form an ester-substituted compound and its salt or a brominated ester-substituted colorant and its salt by admixing the precursor with an alcohol of the formula $R_2$—OH, an optional solvent, and an optional esterification catalyst and heating, as follows (illustrated for an embodiment wherein Y is a hydrogen atom, n is 0, and X is —O—):

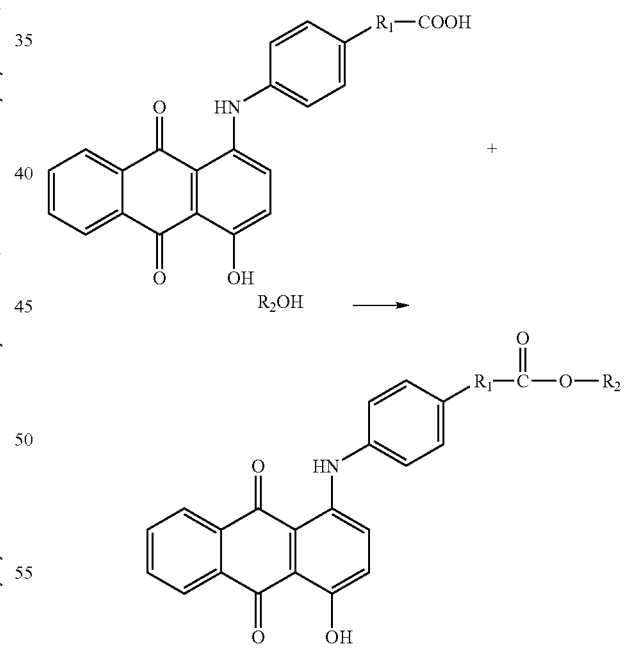

The acid-substituted precursor or brominated acid-substituted precursor and the alcohol are present in any desired or effective relative amounts, in one embodiment at least about 1 mole of alcohol per every one mole of acid-substituted precursor or brominated acid-substituted precursor, in another embodiment at least about 1.05 moles of alcohol per every one mole of acid-substituted precursor or brominated acid-substituted precursor, and in yet another embodiment at least about 1.1 moles of alcohol per every one mole of acid-substituted precursor or brominated acid-substituted precursor, and in one embodiment no more than about 2 moles of alcohol per every one mole of acid-substituted precursor or brominated acid-substituted precursor, in another embodiment no more than about 1.5 moles of alcohol per every one mole of acid-substituted precursor or brominated acid-substituted precursor, and in yet another embodiment no more than about 1.25 moles of alcohol per every one mole of acid-substituted precursor or brominated acid-substituted precursor, although the relative amounts of acid-substituted precursor or brominated acid-substituted precursor and alcohol can be outside of these ranges.

When the optional esterification catalyst is present, any desired or effective esterification catalyst can be used, such as para-toluene sulfonic acid, dibutyl tin dilaurate, or the like, as well as mixtures thereof. The esterification catalyst is present in any desired or effective amount, in one embodiment at least about 0.05 mole of esterification catalyst per every one mole of alcohol, and in one embodiment no more than about 0.5 mole of esterification catalyst per mole of alcohol, although the amount of esterification catalyst can be outside of these ranges.

When present, any desired or effective solvent can be used. Examples of suitable solvents include xylene, toluene, benzene, chlorobenzene, nitrobenzene, dichlorobenzene, and the like, as well as mixtures thereof. When the optional solvent is used, the reactants are present in the solvent in any desired or effective amount, in one embodiment at least about 25 grams of alcohol per every one liter of solvent, in another embodiment at least about 50 grams of alcohol per every one liter of solvent, and in yet another embodiment at least about 100 grams of alcohol per every one liter of solvent, and in one embodiment no more than about 200 grams of alcohol per every one liter of solvent, in another embodiment no more than about 150 grams of alcohol per every one liter of solvent, and in yet another embodiment no more than about 100 grams of alcohol per every one liter of solvent, although the amount of solvent can be outside of these ranges.

The reaction mixture containing the alcohol, the acid-substituted precursor or brominated acid-substituted precursor, the optional solvent, and the optional esterification catalyst is heated to any desirable or effective temperature, typically the reflux temperature of the selected solvent, in one embodiment at least about 100° C., and in one embodiment no more than about 130° C., although the temperature can be outside of these ranges.

The reaction mixture containing the alcohol, the acid-substituted precursor or brominated acid-substituted precursor, the optional solvent, and the optional esterification catalyst is heated for any desirable or effective period of time, in one embodiment at least about 2 hours, in another embodiment at least about 24 hours, and in one embodiment no more than about 72 hours, and in another embodiment no more than about 48 hours, although the heating time can be outside of these ranges.

The esterified compound or the brominated esterified colorant can be recovered from the reaction mixture as a solid by filtration, followed by washing and drying. If desired, purification can be carried out by filtration, redissolution in the solvent, heating, cooling, precipitating the colorant from the solution, filtering, washing the colorant with a solvent such as methanol, ethanol, or the like, and repeating this cycle until thin layer chromatography of the collected solid indicates that there is no detectable unreacted reactant present in the solid.

The acid-substituted precursor or brominated acid-substituted precursor can be amidified to form an amide-substituted compound and its salt or a brominated amide-substituted colorant and its salt by admixing the precursor with a primary or secondary amine of the formula $NHR_2R_3$, an optional solvent, and an optional amidification catalyst and heating, as follows (illustrated for an embodiment wherein Y is a hydrogen atom, n is O, $R_3$ is a hydrogen atom, and X is —NH—):

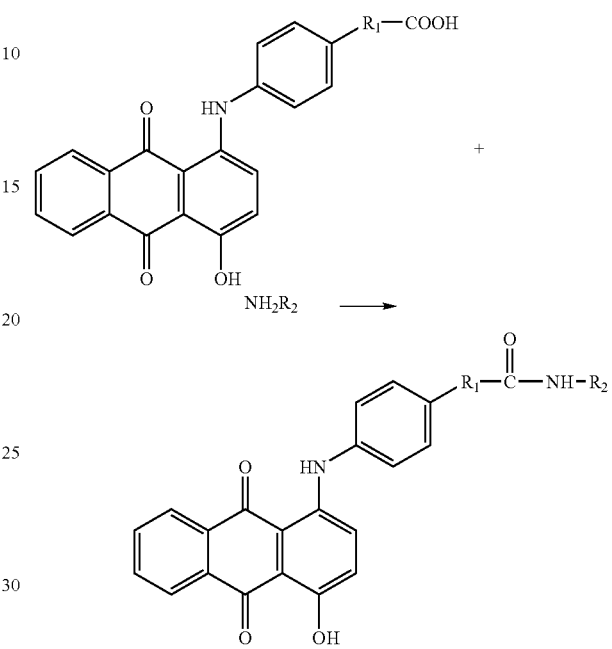

The acid-substituted precursor or brominated acid-substituted precursor and the amine are present in any desired or effective relative amounts, in one embodiment at least about 1 mole of amine per every one mole of acid-substituted precursor or brominated acid-substituted precursor, in another embodiment at least about 1.05 moles of amine per every one mole of acid-substituted precursor or brominated acid-substituted precursor, and in yet another embodiment at least about 1.1 moles of amine per every one mole of acid-substituted precursor or brominated acid-substituted precursor, and in one embodiment no more than about 2 moles of amine per every one mole of acid-substituted precursor or brominated acid-substituted precursor, in another embodiment no more than about 1.5 moles of amine per every one mole of acid-substituted precursor or brominated acid-substituted precursor, and in yet another embodiment no more than about 1.25 moles of amine per every one mole of acid-substituted precursor or brominated acid-substituted precursor, although the relative amounts of acid-substituted precursor or brominated acid-substituted precursor and amine can be outside of these ranges.

When the optional amidification catalyst is present, any desired or effective amidification catalyst can be used, such as phosphoric acid or the like. The amidification catalyst is present in any desired or effective amount, in one embodiment at least about 0.05 mole of amidification catalyst per every one mole of amine, and in one embodiment no more than about 0.5 mole of amidification catalyst per mole of amine, although the amount of amidification catalyst can be outside of these ranges.

When present, any desired or effective solvent can be used. Examples of suitable solvents include xylene, toluene, benzene, chlorobenzene, nitrobenzene, dichlorobenzene, and the like, as well as mixtures thereof. When the optional solvent is used, the reactants are present in the solvent in any desired or effective amount, in one embodiment at least about 25 grams of amine per every one liter of solvent, in another embodiment at least about 50 grams of amine per every one liter of solvent, and in yet another embodiment at least about 100 grams of amine per every one liter of solvent, and in one embodiment no more than about 200 grams of amine per every one liter of solvent, in another embodiment no more than about 150 grams of amine per every one liter of solvent, and in yet another embodiment no more than about 100 grams of amine per every one liter of solvent, although the amount of solvent can be outside of these ranges.

The reaction mixture containing the amine, the acid-substituted precursor or brominated acid-substituted precursor, the optional solvent, and the optional amidification catalyst is heated to any desirable or effective temperature, typically the reflux temperature of the selected solvent, in one embodiment at least about 100° C., and in one embodiment no more than about 200° C., although the temperature can be outside of these ranges.

The reaction mixture containing the amine, the acid-substituted precursor or brominated acid-substituted precursor, the optional solvent, and the optional amidification catalyst is heated for any desirable or effective period of time, in one embodiment at least about 2 hours, in another embodiment at least about 24 hours, and in one embodiment no more than about 72 hours, and in another embodiment no more than about 48 hours, although the heating time can be outside of these ranges.

The amidified compound or the brominated amidified colorant can be recovered from the reaction mixture as a solid by filtration, followed by washing and drying. If desired, purification can be carried out by filtration, redissolution in the solvent, heating, cooling, precipitating the colorant from the solution, filtering, washing the colorant with a solvent such as methanol, ethanol, or the like, and repeating this cycle until thin layer chromatography of the collected solid indicates that there is no detectable unreacted reactant present in the solid.

The acid-substituted precursor, unbrominated esterified compound, or unbrominated amidified compound can be brominated to form a brominated acid, ester, or amide substituted colorant and its salt by admixing it with bromine and an optional solvent, followed by quenching with water, as follows (illustrated for an embodiment wherein the acid-substituted precursor was prepared from para-aminophenylacetic acid and wherein the brominated product has Y being a hydrogen atom, n=2, and the two bromine atoms in the ortho positions adjacent to the nitrogen atom):

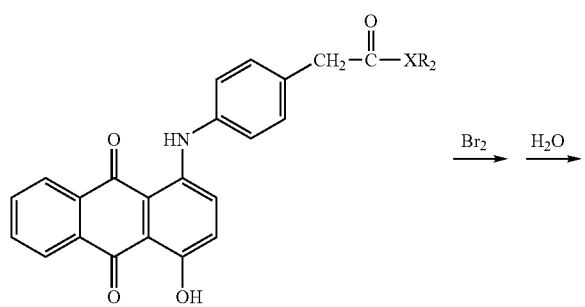

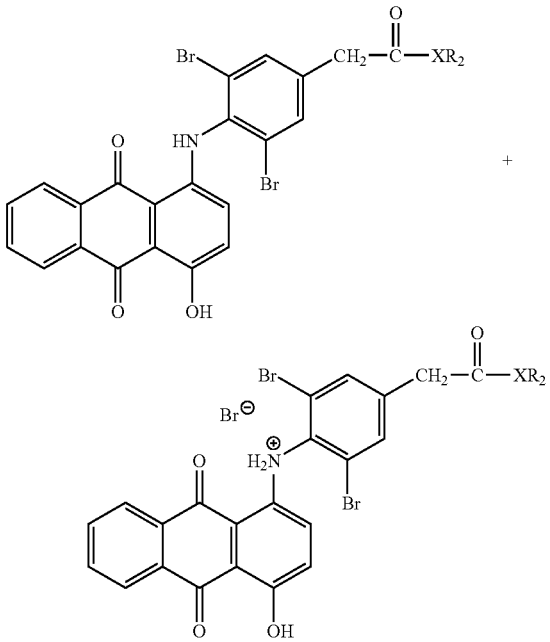

The mixture of products contains both an amine compound and the HBr salt thereof.

Bromine ($Br_2$) can be provided by any desired or effective method, such as by adding elemental bromine, or by generating $Br_2$ in situ in the reaction mixture by the addition of a combination of a bromide salt and a bromate salt, as disclosed in, for example, *Kirk-Othmer Encyclopedia of Chemical Technology*, Vol. 4, 4$^{th}$ Edition, ISBN 0-471-52672-X, John Wiley & Sons, Inc. (New York 1992), the disclosure of which is totally incorporated herein by reference, or the like.

The acid-substituted precursor, unbrominated esterified compound, or unbrominated amidified compound and the bromine are present in any desired or effective relative amounts, in one embodiment at least about 2 moles of $Br_2$ per every one mole of acid-substituted precursor, unbrominated esterified compound, or unbrominated amidified compound, in another embodiment at least about 2.5 moles of $Br_2$ per every one mole of acid-substituted precursor, unbrominated esterified compound, or unbrominated amidified compound, and in yet another embodiment at least about 3 moles of $Br_2$ per every one mole of acid-substituted precursor, unbrominated esterified compound, or unbrominated amidified compound, and in one embodiment no more than about 4 moles of $Br_2$ per every one mole of acid-substituted precursor, unbrominated esterified compound, or unbrominated amidified compound, in another embodiment no more than about 3.5 moles of $Br_2$ per every one mole of acid-substituted precursor, unbrominated esterified compound, or unbrominated amidified compound, and in yet another embodiment no more than about 3.25 moles of $Br_2$ per every one mole of acid-substituted precursor, unbrominated esterified compound, or unbrominated amidified compound, although the amount of bromine can be outside of these ranges. Higher amounts of bromine lead to higher degrees of substitution with bromine atoms. Greater amounts of bromine and/or higher reaction temperatures are selected when it is desired to place a bromine atom in the Y position.

Examples of suitable optional solvents include acetic acid, propionic acid, formic acid, butyric acid, dimethyl formamide, dimethyl sulfoxide, hexamethyl phosphorus triamide (HMPA), tetrahydrofuran, or the like, as well as mixtures thereof. When present, the optional solvent is present in any desired or effective amount, in one embodiment at least about 25 grams of acid-substituted precursor, unbrominated esterified compound, or unbrominated amidified compound per every one liter of solvent, and in another embodiment at least about 100 grams of acid-substituted precursor, unbrominated esterified compound, or unbrominated amidified compound per every one liter of solvent, and in one embodiment no more than about 200 grams of acid-substituted precursor, unbrominated esterified compound, or unbrominated amidified compound per every one liter of solvent, although the amount of solvent can be outside of these ranges.

The reaction mixture containing the acid-substituted precursor, unbrominated esterified compound, or unbrominated amidified-compound, the bromine, and the optional solvent generally can be initially heated to a temperature of about 30° C. to about 40° C. The reaction of the acid-substituted precursor, unbrominated esterified compound, or unbrominated amidified compound with the bromine tends to be exothermic, and the reaction mixture is generally maintained at a desirable temperature by controlling the rate of addition of bromine as well as by any desired external source, such as a heating mantle or the like. The reaction mixture containing the acid-substituted precursor, unbrominated esterified compound, or unbrominated amidified compound, the bromine, and the solvent is maintained any desirable or effective temperature, in one embodiment at least about 25° C., and in another embodiment at least about 50° C., and in one embodiment no more than about 100° C., and in another embodiment no more than about 60° C., although the temperature can be outside of these ranges.

The reaction between the acid-substituted precursor, unbrominated esterified compound, or unbrominated amidified compound and the bromine is allowed to proceed for any desirable or effective period of time, in one embodiment at least about 5 hours, and in one embodiment no more than about 24 hours, although the reaction time can be outside of these ranges.

Subsequent to completion of the bromination reaction, the reaction mixture can be poured into water to quench the reaction. Any desired or effective amount of water can be used—in one embodiment at least about 1.5 times as much water by volume as the volume of the reaction mixture, in another embodiment at least about 2 times as much water by volume as the volume of the reaction mixture, in yet another embodiment at least about 2 times as much water by volume as the volume of the reaction mixture, and in still another embodiment at least about 3 times as much water by volume as the volume of the reaction mixture, although the amount of water can be outside of these ranges.

The mixture of the brominated compound and its salt can be recovered from the reaction mixture as a solid by filtration, washed, and dried.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

To a 500 milliliter round bottom flask equipped with magnetic stir bar was added 13.5 grams of p-aminophenylacetic acid (obtained from TCI America, Portland Oreg.), 8.7 grams of leucoquinizarin (obtained from Aceto Corp., Lake Success, N.Y.), 12.9 grams of quinizarin (obtained from Aceto Corp.), 5.4 grams of boric acid (obtained from Aldrich Chemical Co., Milwaukee, Wis.), and 120 grams of ethanol. The flask was placed under stirring and a condenser in a hot oil bath at 120° C. for 19 hours. Thereafter, the mixture was allowed to cool to room temperature. The resulting precipitated solids were collected by vacuum filtration, recrystallized in n-butanol, and dried overnight in a vacuum oven. Yield: 19.2 grams of a compound believed to be of the formula

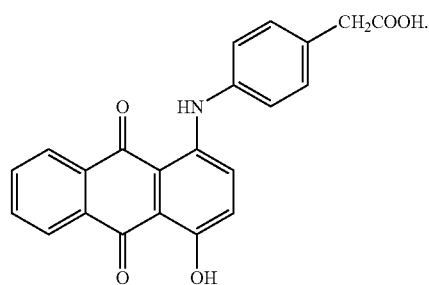

EXAMPLE IIa

To a 250 milliliter round bottom flask equipped with magnetic stir bar was added 5 grams of the compound prepared in Example I, 4 grams of stearyl alcohol (ALFOL 18, obtained from Condea Vista, Austin Tex.), 70 grams of xylene, and 2 drops of FASCAT 4202 catalyst (obtained from Elf Atochem North America Inc., Philadelphia, Pa.). The flask was placed under stirring and a condenser and Dean Stark trap in a hot oil bath at 150° C. for 6 hours. Thin layer chromatography (TLC) by normal phase in 10 percent methanol in toluene showed a peak corresponding to the starting material as well as a peak corresponding to the product, indicating that the reaction was not complete. An additional 2 grams of stearyl alcohol and an additional 2 drops of FASCAT 4202 catalyst were added to the reaction mixture and the mixture was allowed to reflux for an additional 19 hours, after which TLC indicated that the reaction was still not complete. Thereafter, 0.5 grams of p-toluene sulfonic acid (additional catalyst; obtained from Boliden Intertrade Inc., Atlanta, Ga.) was added to the mixture and the reaction mixture was refluxed for an additional 6 hours, after which TLC indicated that the reaction was complete. Thereafter the solvent was distilled off and the product was collected. It is believed that the product was of the formula

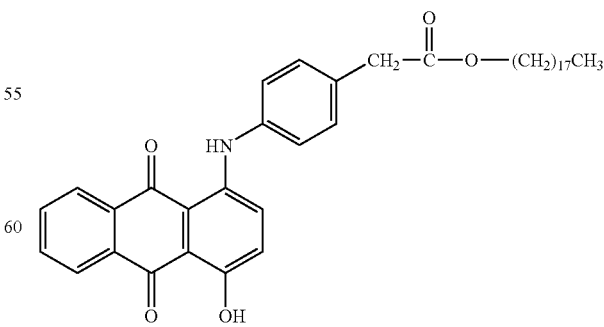

The spectral strength of the product was determined using a spectrophotographic procedure based on the measurement of the colorant in solution by dissolving the product in toluene and measuring the absorbance using a Perkin Elmer Lambda 2S UV/VIS spectrophotometer. The spectral strength of the product was measured as about 14,275 mL Absorbance Units per gram at absorption $\lambda_{max}$ (535 nm).

EXAMPLE IIb

To a 3-neck 500 milliliter round-bottom flask with mechanical stirrer and constant pressure addition funnel, all placed in a 45° C. oil bath, was added 2.0 grams of the ester obtained in Example Ia and 25 milliliters of glacial acetic acid (obtained from Aldrich Chemical Co., Milwaukee, Wis.), after which stirring and heating were carried out for 5 minutes. 2.10 grams of bromine (obtained from Aldrich Chemical Co.) was then added dropwise over 5 minutes. The reaction mixture was thereafter heated and stirred for 15 additional minutes, cooled to room temperature, and poured into a 1 liter beaker containing 500 milliliters of methanol. The solid brominated product was filtered and washed with about 250 milliliters of additional methanol and allowed to dry. 1.77 grams of product were obtained. It is believed that this product was of the formula

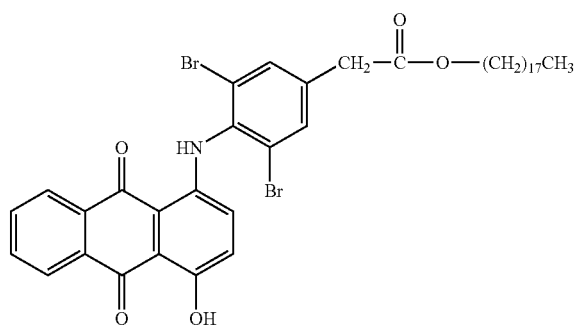

EXAMPLE IIIa

A compound of the formula

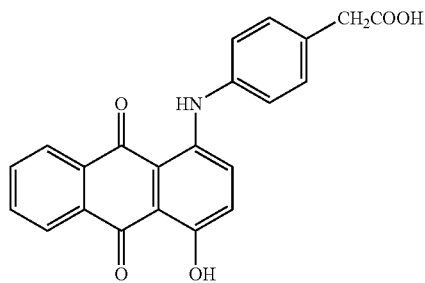

was prepared as described in Example I. Thereafter, to a 250 milliliter round bottom flask equipped with magnetic stir bar was added 5 grams of the compound thus formed, 12.5 grams of UNILIN 700 alcohol (linear chain alcohol with an average of about 50 carbon atoms; obtained from Baker Petrolite Corp., Sugarland, Tex.), 70 grams of xylene, and a spatula tip full of p-toluene sulfonic acid. The flask was placed under stirring and a condenser and Dean Stark trap in a hot oil bath at 150° C. for 48 hours. TLC showed a peak corresponding to the starting material as well as a peak corresponding to the product, indicating that the reaction was complete. Thereafter the solvent was distilled off and the product was collected. It is believed that the product was of the formula

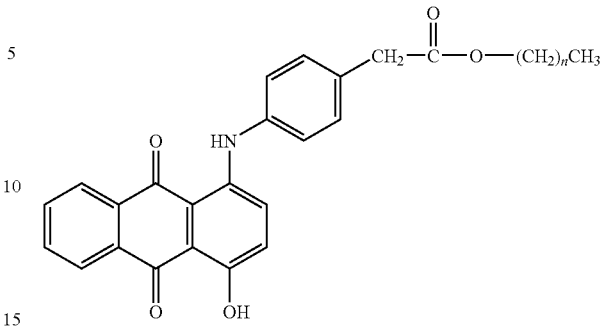

wherein n had an average value of about 49. The spectral strength of the product was determined using a spectrophotographic procedure based on the measurement of the colorant in solution by dissolving the product in toluene and measuring the absorbance using a Perkin Elmer Lambda 2S UV/VIS spectrophotometer. The spectral strength of the product was measured as about 3,835 mL Absorbance Units per gram at absorption $\lambda_{max}$ (538 nm).

EXAMPLE IIIb

To a 3-neck 500 milliliter round-bottom flask with mechanical stirrer and constant pressure addition funnel, all placed in a 45° C. oil bath, was added 3.03 grams of the ester obtained in Example IIIa and 25 milliliters of glacial acetic acid (obtained from Aldrich Chemical Co.), after which stirring and heating were carried out for 5 minutes. 4.4 grams of bromine (obtained from Aldrich Chemical Co.) was then added dropwise over 5 minutes. The reaction mixture was thereafter heated and stirred for about 15 additional minutes, cooled to room temperature, and poured into a 1 liter beaker containing 500 milliliters of methanol. The solid product was filtered and collected. The product was then slurried in a 1 percent NaOH/water solution and again filtered and allowed to dry. 2.87 grams of product were obtained. TLC indicated much unbrominated starting material, so the material was transferred to a 500 milliliter 3-neck flask and 25 milliliters of glacial acetic acid was added and the mixture was heated to 100C. 4.49 grams of bromine was added over 8 minutes and the reaction mixture was heated for an additional 25 minutes before cooling. The reaction mixture was then poured into a 1 liter beaker containing 500 milliliters of methanol. The solid brominated product was filtered and collected. 2.66 grams of product was obtained that by TLC appeared to be brominated. It is believed that this product was of the formula

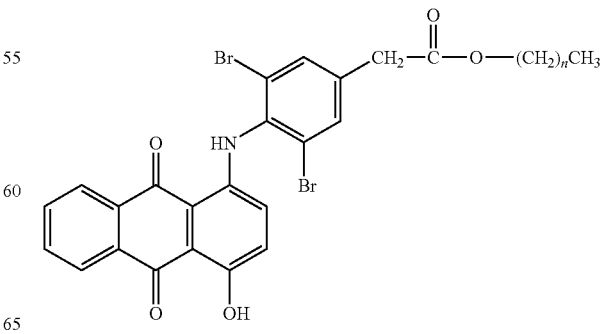

wherein n had an average value of about 49.

EXAMPLE IVa

To a 250 milliliter round bottom flask equipped with magnetic stir bar is added 5 grams of the compound formed in Example I, 4 grams of dimer diol (PRIPOL 2033, available from Uniqema, New Castle, Del.), 70 grams of xylene, and 2 drops of FASCAT 4202 catalyst (available from Elf Atochem North America Inc., Philadelphia, Pa.). The flask is placed under stirring and a condenser and Dean Stark trap in a hot oil bath at 150° C. for 48 hours. Thin layer chromatography (TLC) by normal phase in 10 percent methanol in toluene is used to indicate reaction completion. Thereafter the solvent is distilled off and the product is collected. It is believed that the product will be of the formula

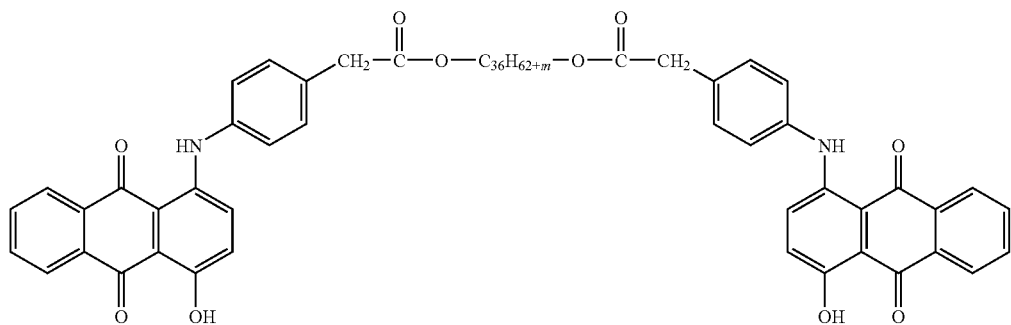

wherein $C_{36}H_{62+m}$ is a branched alkylene group which may include unsaturations and cyclic groups, wherein m is an integer of 0, 1, 2, 3, 4, 5, 6, 7, 8, 9, or 10, and wherein it is believed that at least some of the monomers will be of the formula

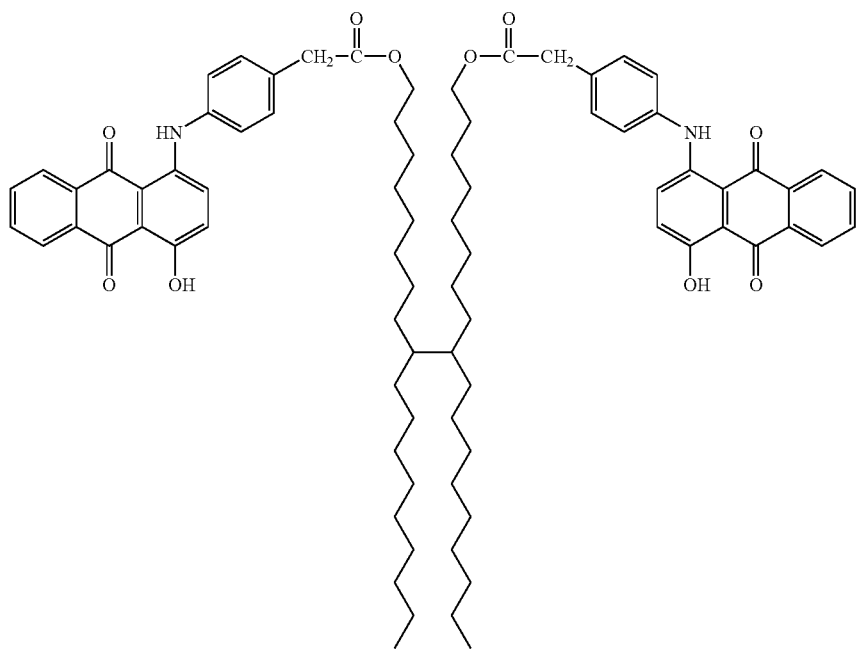

EXAMPLE IVb

To a 3-neck 500 milliliter round-bottom flask with mechanical stirrer and constant pressure addition funnel, all placed in a 45° C. oil bath, is added 2.0 grams of the ester obtained in Example IVa and 25 milliliters of glacial acetic acid (available from Aldrich Chemical Co.), after which stirring and heating are carried out for 5 minutes. 2.10 grams of bromine (available from Aldrich Chemical Co.) is then added dropwise over 5 minutes. The reaction mixture is thereafter heated and stirred for about 15 additional minutes, cooled to room temperature, and poured into a 1 liter beaker containing 500 milliliters of methanol. The solid brominated product is filtered and washed with about 250 milliliters of additional methanol and is allowed to dry. It is believed that the product will be of the formula

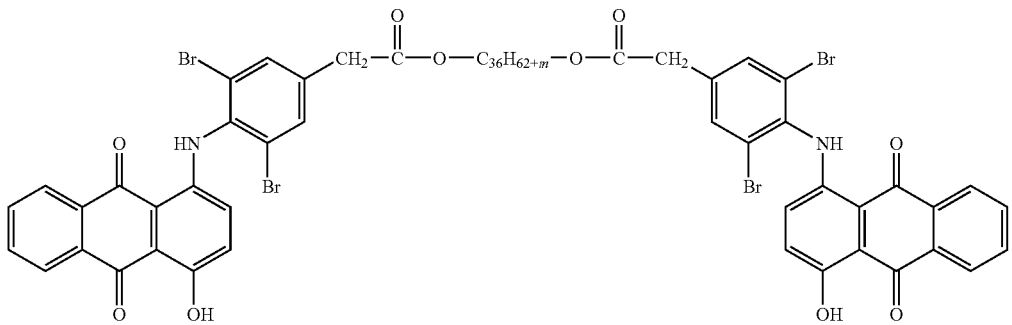

wherein $C_{36}H_{62+m}$ is a branched alkylene group which may include unsaturations and cyclic groups, wherein m is an integer of 0, 1, 2, 3, 4, 5, 6, 7, 8, 9, or 10 and wherein it is believed that at least some of the monomers will be of the formula

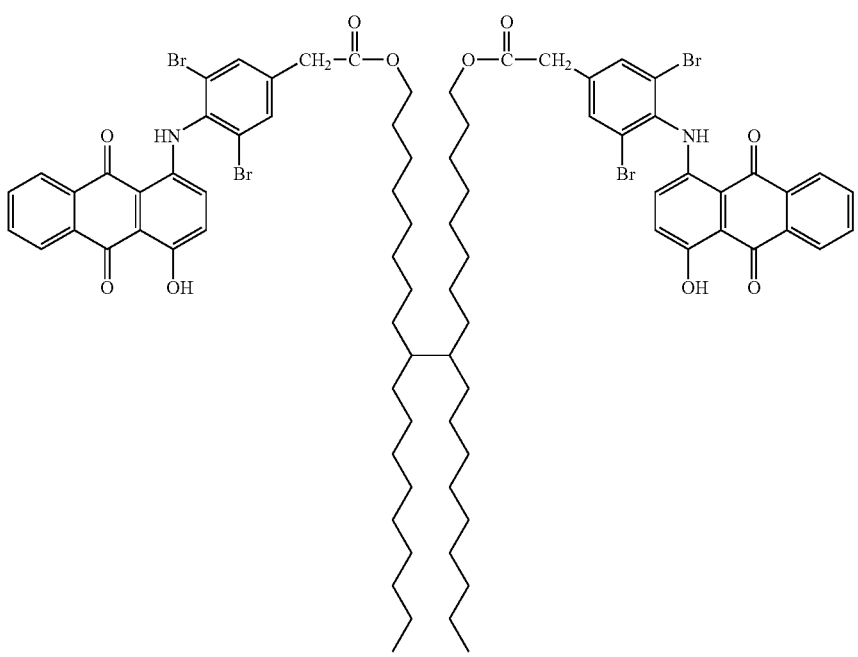

EXAMPLE Va

To a 250 milliliter round bottom flask equipped with magnetic stir bar is added 5 grams of the compound formed in Example I, 8 grams of octadecyl amine (ARMEEN 18 D, available from Akzo Nobel Chemicals Inc., McCook, Ill.), 70 grams of xylene, and 2 drops of FASCAT 4202 catalyst (available from Elf Atochem North America Inc., Philadelphia, Pa.). The flask is placed under stirring and a condenser and Dean Stark trap in a hot oil bath at 150° C. for 48 hours. Thin layer chromatography (TLC) by normal phase in 10 percent methanol in toluene is used to determine reaction completion. Thereafter, the solvent is distilled off and the product is collected. It is believed that the product will be of the formula

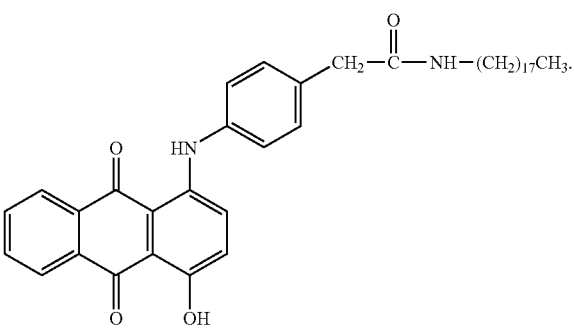

EXAMPLE Vb

To a 3-neck 500 milliliter round-bottom flask with mechanical stirrer and constant pressure addition funnel, all placed in a 45° C. oil bath, is added 2.0 grams of the amide obtained in Example Va and 25 milliliters of glacial acetic acid (available from Aldrich Chemical Co.), after which stirring and heating are carried out for 5 minutes. 2.10 grams of bromine (available from Aldrich Chemical Co.) is then added dropwise over 5 minutes. The reaction mixture is thereafter heated and stirred for about 15 additional minutes, cooled to room temperature, and poured into a 1 liter beaker containing 500 milliliters of methanol. The solid product is filtered and washed with about 250 milliliters of additional methanol and allowed to dry. It is believed that the product will be of the formula

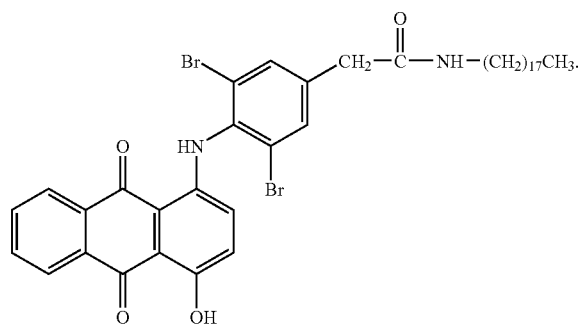

EXAMPLE VI

An ink base was prepared by melting, admixing, and filtering the following ingredients:
- polyethylene wax (PE 655, obtained from Baker Petrolite, Tulsa, Okla., of the formula $CH_3(CH_2)_{50}CH_3$), 42.01 parts by weight:
- stearyl stearamide wax (KEMAMIDE® S-180, obtained from Crompton Corporation, Greenwich, Conn.), 18.82 parts by weight;
- tetra-amide resin obtained from the reaction of one equivalent of a C-36 dimer acid obtained from Uniqema, New Castle, Del. with two equivalents of ethylene diamine and UNICID® 700 (obtained from Baker Petrolite, Tulsa, Okla., a long chain hydrocarbon having a terminal carboxylic acid group), prepared as described in Example 1 of U.S. Pat. No. 6,174,937, the disclosure of which is totally incorporated herein by reference, 24.99 parts by weight;
- urethane resin obtained from the reaction of two equivalents of ABITOL® E hydroabietyl alcohol (obtained from Hercules Inc., Wilmington, Del.) and one equivalent of isophorone diisocyanate, prepared as described in Example 1 of U.S. Pat. No. 5,782,966, the disclosure of which is totally incorporated herein by reference, 8.82 parts by weight,
- urethane resin that is the adduct of three equivalents of stearyl isocyanate and a glycerol-based alcohol, prepared as described in Example 4 of U.S. Pat. No. 6,309,453, the disclosure of which is totally incorporated herein by reference, 5.21 parts by weight: and
- NAUGUARD® 445 antioxidant (available from Uniroyal Chemical Co., Middlebury, Conn.), 0.15 parts by weight.

Thereafter, two inks were prepared by admixing different amounts of the dye prepared in Example I with the ink base thus prepared. The dye and ink base in each case were added to a 140 milliliter beaker and heated in an oven at 135° C. until molten. Subsequently, the beaker was inserted in an oil heating bath at 135° C. and the contents of the beaker were stirred for 45 minutes, followed by pouring the contents into aluminum pans and allowing the ink thus prepared to solidify. Ink 1 contained 0.5 grams of the dye and 22.02 grams of the ink base. Ink 2 contained 0.8 grams of the dye and 17.22 grams of the ink base.

Dynamic Viscosity is a material property which is used to characterize the resistance to flow, with high numbers indicating high resistance. The dynamic viscosity of the inks was measured using a stress-controlled Dynamic Stress Rheometer (DSR) 2000 from Rheometric Scientific (now TA Instruments). Geometry was 40 mm diameter Cone and Plate. A stress of 1 Pascal was constantly maintained during a step-stress experiment, and viscosity data points were gathered at an approximate rate of 0.5 points per second. Each measurement lasted approximately 5 minutes, with an equilibration period of about 80 seconds; subsequently, data measured between 100 and 300 seconds were averaged. The dynamic viscosity of Ink 1 at 140° C. was 10.51 milliPascal seconds (centipoise) and the dynamic viscosity of Ink 2 at 140° C. was 10.72 milliPascal seconds (centipoise).

The spectral strength of the inks were determined using a spectrophotographic procedure based on the measurement of the ink in solution by dissolving the ink in toluene and measuring the absorbance using a Perkin Elmer Lambda 2S UV/VIS spectrophotometer. The spectral strength of Ink 1 was measured as about 324 mL Absorbance Units per gram at absorption $\lambda_{max}$ of 535 nanometers, and the spectral strength of Ink 2 was measured as about 633 mL Absorbance Units per gram at absorption $\lambda_{max}$ of 535 nanometers.

EXAMPLE VII

Two inks were prepared by admixing different amounts of the dye prepared in Example II with the ink base prepared in Example VI by the method described in Example VI. Dynamic viscosity and spectral strength of these inks were measured as described in Example VI. Ink 3 contained 3.0 grams of the dye and 29.93 grams of the ink base, and exhibited a dynamic viscosity at 140° C. of 10.88 milliPascal seconds (centipoise) and a spectral strength of about 355 mL Absorbance Units per gram at absorption $\lambda_{max}$ of 535 nanometers. Ink 4 contained 4.0 grams of the dye and 17.95 grams of the ink base, and exhibited a dynamic viscosity at 140° C. of 11.52 milliPascal seconds (centipoise) and a spectral strength of about 700 mL Absorbance Units per gram at absorption $\lambda_{max}$ of 535 nanometers.

EXAMPLE VIII

The inks prepared in Examples VI and VII were used to generate prints on HAMMERMILL LASERPRINT® paper using a K Printing Proofer (manufactured by RK Print Coat Instrument Ltd., Litlington, Royston, Heris, SG8 0OZ, U.K.). In this method, the tested inks were melted onto a stainless steel printing plate which featured engraved 3.75 inch by 1.9 inch rectangular patterns of different depth and profile, allowing different amounts of ink to accumulate in these areas, hence generating rectangular prints with different ink coverage during the printing process, the printing plate being set at 150° C. temperature. A roller bar fitted with the paper was then rolled over the plate containing the melted ink on its surface. The ink on the paper was cooled, resulting in three separated images of rectangular blocks. Fingerprint diffusion tests were then carried out on the prints having the highest and lowest degrees of ink coverage by having a test person rub fingers two times with fragrance-free LUBRIDERM® hand lotion. After each rub, the fingers were dried with a towel. The surfaces of the prints were then contaminated by touching them with the fingers, exerting an equal and moderate pressure. Thereafter, the prints were placed into manila folders with sheets of paper between the samples and maintained at room temperature for five days, after which the prints were inspected for changes. The results indicated that the dyes prepared in Example II were particularly resistant to fingerprint diffusion.

EXAMPLE IX

Prints were generated with the inks prepared in Examples VI and VII by the method described in Example VIII. SCOTCH® brand transparent tape was then attached to the prints in such a way that it simultaneously covered printed and unprinted areas of the prints. After attachment of the tape, the prints were placed into manila folders with sheets of paper between the samples and placed in an oven at 60° C. for five days, after which the prints were inspected for changes. The results indicated that the dyes prepared in Example II were particularly resistant to tape diffusion.

What is claimed is:
1. A colorant compound of the formula

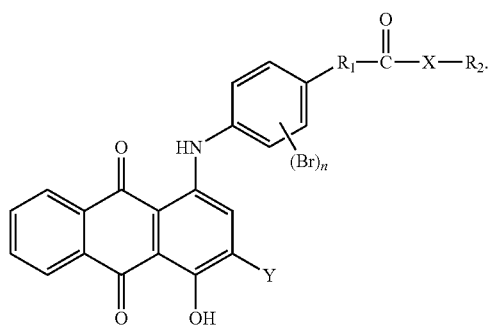

wherein Y is a hydrogen atom or a bromine atom,
n is an integer of 0, 1, 2, 3, or 4;
$R_1$ is an alkylene group, an arylene group, an arylalkylene group, or an alkylarylene group, provided that no oxygen atom creates a

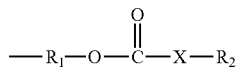

linkage;
X is —O— or —$NR_3$—;
wherein $R_3$ is a hydrogen atom, an alkyl group, an aryl group, an arylalkyl group, or an alkylaryl group;
provided that when X is —$NR_3$—, $R_2$ is a hydrogen atom, an alkyl group, an aryl group, an arylalkyl group, or an alkylaryl group and
at least one of $R_2$ and $R_3$ is other than hydrogen and the total number of carbon atoms in $R_2$+$R_3$ at least 18;
provided that when X is O, $R_2$ is an alkyl group, an aryl group, an arylalkyl group, or an alkylaryl group having at least 18 carbon atoms; and
provided that when X is —$NR_3$—, either (1) n is 2, (2) $R_1$ is a substituted alkylene group, (3) $R_1$ is an alkylene group wherein no hetero atoms are present in the alkylene group, (4) $R_1$ is an arylene group, (5) $R_1$ is an arylalkylene group or an alkylarylene group, (6) $R_3$ is a hydrogen atom, (7) $R_2$ is a hydrogen atom, (8) $R_2$ is an aryl group, or (9) $R_2$ is an arylalkyl group or an alkylaryl group.

2. A compound according to claim 1 wherein Y is a hydrogen atom.
3. A compound according to claim 1 wherein n is 0.
4. A compound according to claim 1 wherein n is 2.
5. A compound according to claim 1 of the formula

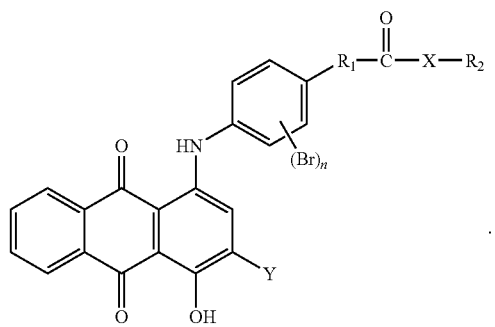

6. A compound according to claim 5 of the formula

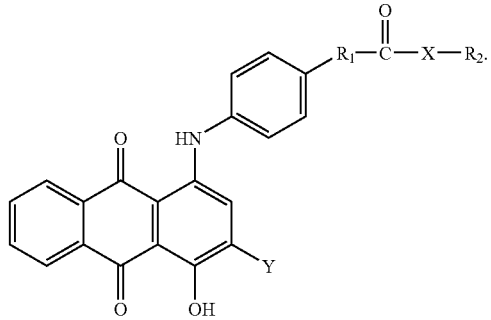

7. A compound according to claim 5 of the formula

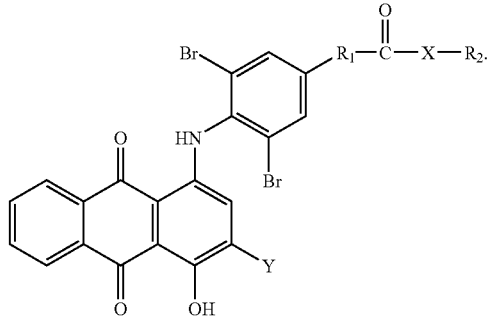

8. A compound according to claim 1 wherein $R_1$ is an alkylene group.

9. A compound according to claim 8 wherein $R_1$ is an unsubstituted alkylene group.

10. A compound according to claim 8 wherein $R_1$ is a substituted alkylene group.

11. A compound according to claim 8 wherein $R_1$ is an alkylene group wherein hetero atoms selected from oxygen, nitrogen, sulfur, silicon, phosphorus, or mixtures thereof are present in the alkylene group.

12. A compound according to claim 8 wherein $R_1$ is an alkylene group wherein no hetero atoms are present in the alkylene group.

13. A compound according to claim 1 wherein $R_1$ is an arylene group.

14. A compound according to claim 13 wherein $R_1$ is an unsubstituted arylene group.

15. A compound according to claim 13 wherein $R_1$ is a substituted arylene group.

16. A compound according to claim 13 wherein $R_1$ is an arylene group wherein hetero atoms selected from oxygen, nitrogen, sulfur, silicon, phosphorus, or mixtures thereof are present in the arylene group.

17. A compound according to claim 13 wherein $R_1$ is an arylene group wherein no hetero atoms are present in the arylene group.

18. A compound according to claim 1 wherein $R_1$ is an arylalkylene group or an alkylarylene group.

19. A compound according to claim 18 wherein $R_1$ is an unsubstituted arylalkylene or alkylarylene group.

20. A compound according to claim 18 wherein $R_1$ is a substituted arylalkylene or alkylarylene group.

21. A compound according to claim 18 wherein $R_1$ is an arylalkylene or alkylarylene group wherein hetero atoms selected from oxygen, nitrogen, sulfur, silicon, phosphorus, or mixtures thereof are present in either the alkyl portion or the aryl portion or both of the arylalkylene or alkylarylene group.

22. A compound according to claim 18 wherein $R_1$ is anarylalkylene or alkylarylene group wherein no hetero atoms are present in the arylalkylene or alkylarylene group.

23. A compound according to claim 1 wherein $R_1$ is $-CH_2-$.

24. A compound according to claim 1 wherein X is $-O-$.

25. A compound according to claim 1 wherein X is $-NR_3-$.

26. A compound according to claim 25 wherein $R_3$ is a hydrogen atom.

27. A compound according to claim 1 wherein $R_2$ is a hydrogen atom.

28. A compound according to claim 27 wherein X is $-O-$.

29. A compound according to claim 27 wherein X is $-NR_3-$.

30. A compound according to claim 29 wherein $R_3$ is a hydrogen atom.

31. A compound according to claim 1 wherein $R_2$ is an alkyl group.

32. A compound according to claim 31 wherein $R_2$ is an unsubstituted alkyl group.

33. A compound according to claim 31 wherein $R_2$ is a substituted alkyl group.

34. A compound according to claim 31 wherein $R_2$ is an alkyl group wherein hetero atoms selected from oxygen, nitrogen, sulfur, silicon, phosphorus, or mixtures thereof are present in the alkyl group.

35. A compound according to claim 31 wherein $R_2$ is an alkyl group wherein no hetero atoms are present in the alkyl group.

36. A compound according to claim 1 wherein $R_2$ is an aryl group.

37. A compound according to claim 36 wherein $R_2$ is an unsubstituted aryl group.

38. A compound according to claim 36 wherein $R_2$ is a substituted aryl group.

39. A compound according to claim 36 wherein $R_2$ is an aryl group wherein hetero atoms selected from oxygen, nitrogen, sulfur, silicon, phosphorus, or mixtures thereof are present in the aryl group.

40. A compound according to claim 36 wherein $R_2$ is an aryl group wherein no hetero atoms are present in the aryl group.

41. A compound according to claim 1 wherein $R_2$ is an arylalkyl group or an alkylaryl group.

42. A compound according to claim 41 wherein $R_2$ is an unsubstituted arylalkyl or alkylaryl group.

43. A compound according to claim 41 wherein $R_2$ is a substituted arylalkyl or alkylaryl group.

44. A compound according to claim 41 wherein $R_2$ is an arylalkyl or alkylaryl group wherein hetero atoms selected from oxygen, nitrogen, sulfur, silicon, phosphorus, or mixtures thereof are present in the arylalkyl or alkylaryl group.

45. A compound according to claim 41 wherein $R_2$ is an arylalkyl or alkylaryl group wherein no hetero atoms are present in the arylalkyl or alkylaryl group.

46. A compound according to claim 1 of the formula

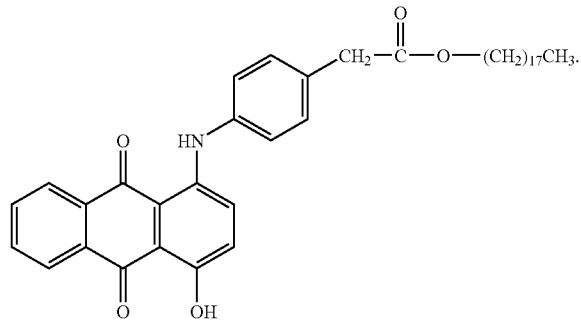

47. A compound according to claim 1 of the formula

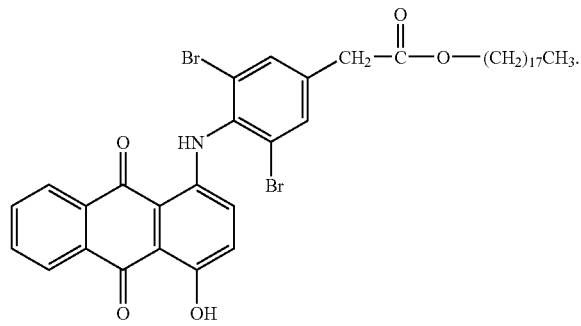

48. A compound according to claim 1 of the formula
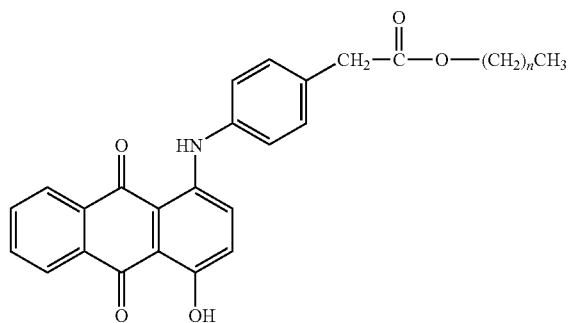
wherein n has an average value of about 49.
49. A compound according to claim 1 of the formula
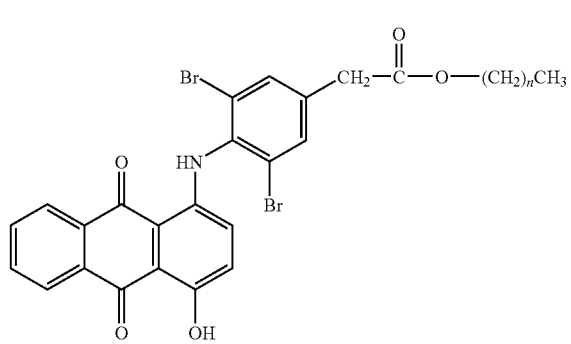
wherein n has an average value of about 49.
50. A compound according to claim 1 of the formula
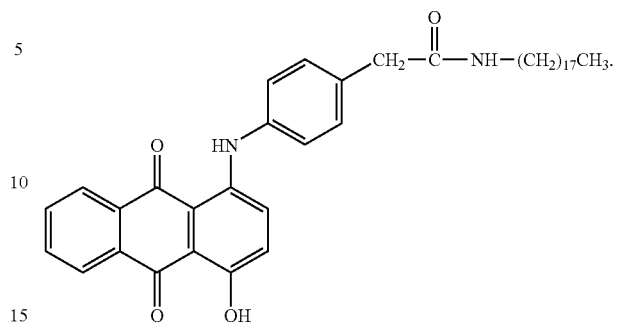
51. A compound according to claim 1 of the formula
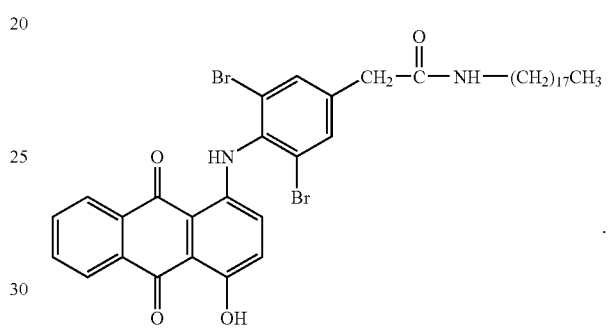
* * * * *